United States Patent [19]
Terasawa et al.

[11] Patent Number: 6,147,714
[45] Date of Patent: *Nov. 14, 2000

[54] CONTROL APPARATUS AND CONTROL METHOD FOR DISPLAYING ELECTRONIC PROGRAM GUIDE

[75] Inventors: Hideo Terasawa; Tomohisa Shiga, both of Kanagawa, Japan

[73] Assignee: Sony Corporation, Tokyo, Japan

[*] Notice: This patent is subject to a terminal disclaimer.

[21] Appl. No.: 08/690,153

[22] Filed: Jul. 19, 1996

[30] Foreign Application Priority Data

Jul. 21, 1995 [JP] Japan ................................ 7-207760

[51] Int. Cl.⁷ .................................................. H04N 5/445
[52] U.S. Cl. ........................ 348/564; 348/906; 348/731; 348/13
[58] Field of Search .................................... 348/906, 563, 348/564, 565, 567, 568, 584, 588, 13, 468, 731, 725; H04N 5/44, 5/445, 5/45

[56] References Cited

U.S. PATENT DOCUMENTS

| | | | |
|---|---|---|---|
| 5,398,074 | 3/1995 | Duffield et al. | 348/564 |
| 5,737,029 | 4/1998 | Ohkura et al. | 348/564 |
| 5,815,145 | 9/1998 | Matthews, III | 348/906 |

FOREIGN PATENT DOCUMENTS

| | | | |
|---|---|---|---|
| 6-54267 | 2/1994 | Japan | H04N 5/44 |
| 6-178227 | 6/1994 | Japan | H04N 5/45 |
| 8-140007 | 5/1996 | Japan | H04N 5/45 |
| 2232031 | 11/1990 | United Kingdom | H04N 5/445 |

*Primary Examiner*—David E. Harvey
*Attorney, Agent, or Firm*—Frommer Lawrence & Haug, LLP.; William S. Frommer; Dennis M. Smid

[57] ABSTRACT

A desired program is selected speedily and reliably from a plurality of programs. Reduced-sized still pictures of typical frames of programs to be broadcast on the respective channels are divided by program category and displayed as an electronic program guide. A cursor is shifted in the left and right directions to select a desired category. When an instruction is given to shift the cursor in the upward and downward directions, the still pictures of the selected category are scrolled. When the picture is determined by a selecting operation, its program is received.

10 Claims, 39 Drawing Sheets

TITLE BAR

FIG. 8

PROMOTION CHANNEL1 PROGRAM PRESENTATION

Programs to be Broadcast

| Station | 7:00 | 8:00 | | 9:00 | |
|---|---|---|---|---|---|
| CNN | World News | | World Sport | Money | |
| MTV | Sting Live | | | US Top 20 | Master Mix |
| Star | Reversed Life | | Heartburn | | |
| CSN | Les Amants du Pont-Neuf | | Lion Heart | | |
| Asahi New Star | Morning Report | Fresh | Yajiuma Wide | | |
| GAORA | European Football | | | Baseball | |

CHANNEL PROGRAM TABLE
(BRIEF PROGRAM EXPLANATION)

DETAILED PROGRAM EXPLANATION

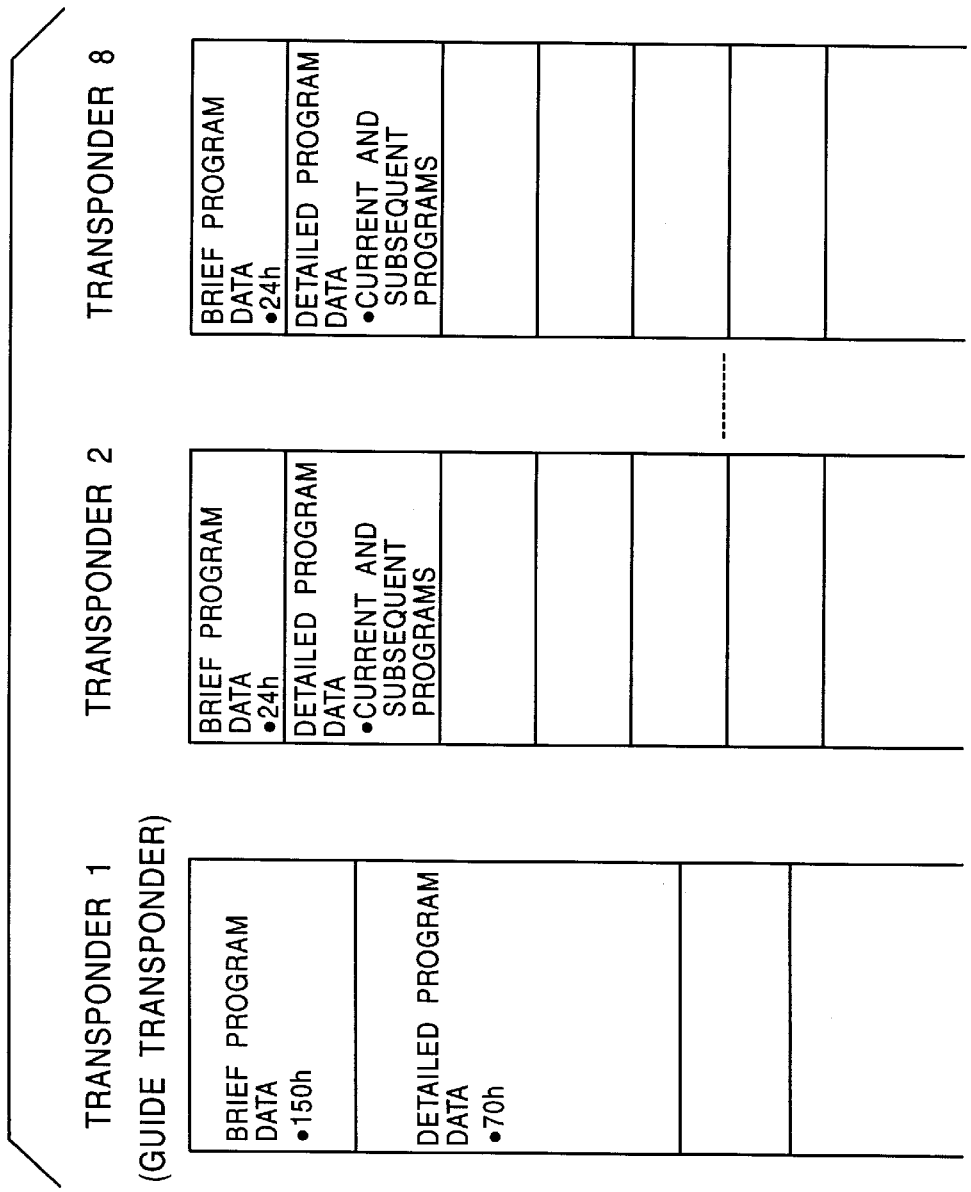

FIG. 13

| ITEM | (item,)descriptor(TABLE) | DATA LENGTH | REMARKS |
|---|---|---|---|
| SERVICE PROVIDER | (service_provider)Service Descriptor(SDT) | | |
| SERVICE NAME | (service_name)Service Descriptor(SDT) | 1 byte | |
| SERVICE TYPE | (service_type)Service Descriptor(SDT) | 60 byte | |
| TITLE | (event_name)Short Event Descriptor(EIT) | 1 byte | |
| SUBTITLE(TYPE) | (Component Descriptor)(EIT) | | |
| CURRENT DATE AND TIME | UTC_time(TDT) | 5 byte | |
| PROGRAM START TIME | start_time(EIT) | 5 byte | |
| PROGRAM DURATION (END TIME) | End_time(EIT) | 3 byte | |
| PARENTAL RATE | Parental Rating Descriptor(EIT) | 1(+3)byte | DATA UNDEFINED |
| PRICE | | | |
| VIDEO MODE | Component Descriptor(EIT) | 1 byte | |
| PROVIDE LANGUAGE | ISO639 language Descriptor(PMT) | 3 byte | CORRESPONDING TO EACH COUNTRY NUMBER |
| PROVIDE SOUND MODE | Component Descriptor(EIT) | 1 byte | |
| CATEGORY | Content Descriptor(EIT) | 2 byte | |
| BRIEF PROGRAM EXPLANATION | Short Event Descriptor(EIT) | 64 byte | |
| DETAILED PROGRAM EXPLANATION | Extended Event Descriptor(EIT) | 256 byte | |
| PROMOTION INFORMATION | Promotion Descriptor(SDT) | | |

FIG. 37
EXAMPLES OF CATEGORY ICONS
 MOVIE            WEATHER
 MUSIC            PROGRAM GUIDE
 SPORT            INFORMATION
 DRAMA            SHOPPING
 VARIETY & SPECIAL   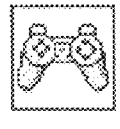 GAMES
 DOCUMENTARY     KARAOKE
 CULTURE & HOBBY    ADULT
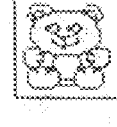 ANIMATION & FAMILY    OTHERS
 NEWS FIG. 38
EXAMPLES OF STATION LOGOS
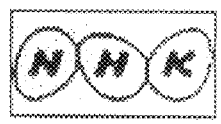 NHK 1
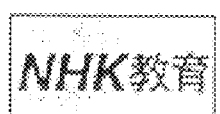 NHK 3
 NTV
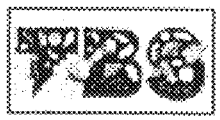 TBS
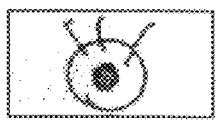 FUJI
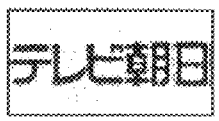 TV ASAHI
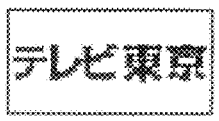 TV TOKYO
 WOWOW

CONTROL APPARATUS AND CONTROL METHOD FOR DISPLAYING ELECTRONIC PROGRAM GUIDE

BACKGROUND OF THE INVENTION

1. Field of the Invention

The present invention relates generally to a control apparatus for displaying an electronic program guide and to a control method for displaying an electronic program guide. More particularly, the invention relates to a control apparatus for displaying an electronic program guide and its control method in which a desired program can be selected from a plurality of programs speedily and positively.

2. Description of the Related Art

Systems for digitizing television signals and transmitting them via a satellite, such as a broadcast satellite or a communication satellite, and receiving them in households are coming into wide use. In such systems, for example, approximately 80 broadcast channels can be ensured, and accordingly, a large number of programs can be broadcast. For selecting a desired program from such a variety of programs, an electronic program guide (EPG) system has been suggested in which an EPG is transmitted from a transmitting end and is received in a receiving end to be displayed. A desired program can thus be selected positively by referring to this EPG.

In this known type of EPG system, however, a large number of programs are merely displayed in a matrix from which a desired program is selected. If it is desired that a predetermined program, for example, a particular sport program or a news program, be received, from programs currently being aired, it is difficult to speedily recognize which is a sport program or which is a news program. Thus, the known EPG system is still difficult to achieve the speedy selection of a desired program.

SUMMARY OF THE INVENTION

Accordingly, in view of the above background, it is an object of the present invention to provide an improved method for selecting a desired program speedily and reliably.

In order to achieve the above object, according to one aspect of the present invention, there is provided a control apparatus for displaying an electronic program guide, comprising: still-picture display means for categorizing a plurality of still pictures and displaying them in a band-like form; designating means for designating with a cursor a predetermined still picture selected from the plurality of still pictures; and selection means for selecting the still picture designated by the designating means.

According to another aspect of the present invention, there is provided a control method for displaying an electronic program guide, comprising the steps of: categorizing a plurality of still pictures and displaying them in a band-like form; designating with a cursor a predetermined still picture selected from the plurality of still pictures; and selecting the designated still picture.

BRIEF DESCRIPTION OF THE DRAWINGS

FIG. 8 illustrates a display example of an entire program table;

FIG. 12 illustrates the operation of transmitting EPG information through transponders;

FIG. 13 illustrates the EPG data;

FIG. 37 illustrates examples of category icons;

FIG. 38 illustrates examples of station logos;

DESCRIPTION OF THE PREFERRED EMBODIMENTS

Figure 1:
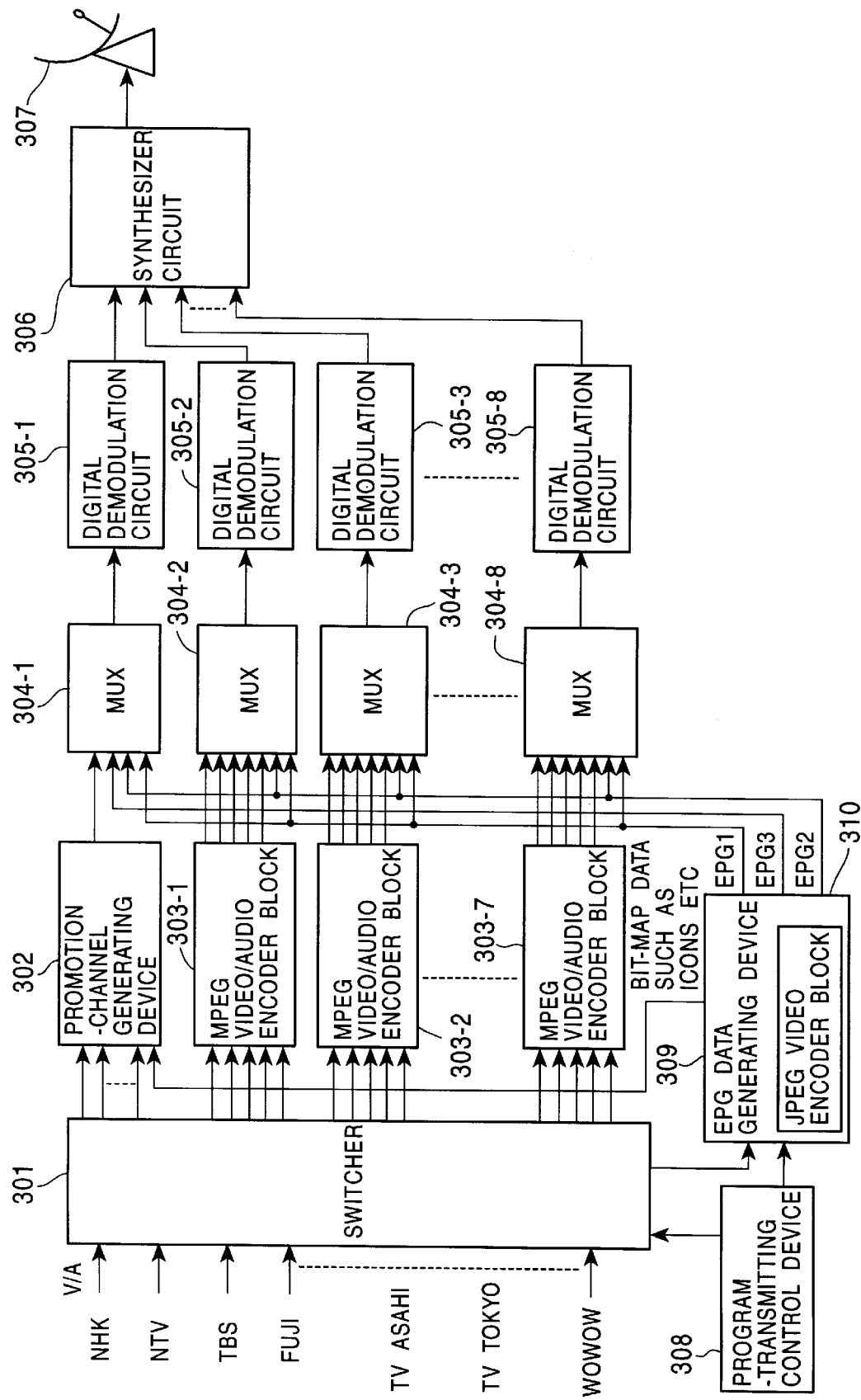
FIG. 1 is a block diagram of an example of the configuration of a transmission system formed by the application of the present invention.

FIG. 1 illustrates an example of the configuration of a transmission apparatus formed by the application of the present invention. This transmission apparatus has a switcher 301. Input into this switcher 301 is digital data representing video data and audio data supplied from broadcast stations in the United States, such as CNN, GAORA, Asahi, STAR, TRY, MTV, Special, Sport, BBC, CSNI, Green (trade names or service marks), etc., and broadcast stations in Japan, such as NHK, NTV, TBS, Fuji, TV Asahi, TV Tokyo, WOWOW (trade names or service marks), etc. Further, digital video signals and audio signals reproduced from a digital videocassette recorder (DVCR) (not shown) are input into the switcher 301.

The switcher 301, controlled by a program-transmitting control device 308, selects a plurality of predetermined broadcast channels (a video signal and an audio signal are counted as a broadcast program) from the input video signals and audio signals and output them to a promotion-channel generating device 302. The switcher 301 also selects five predetermined channels from the input signals and outputs them to a Moving Picture Coding Experts Group (MPEG) video/audio encoder block 303-1. Similarly, the switcher 301 selects and outputs the five channels into each of the MPEG video/audio encoder blocks 303-2 through 303-7. The predetermined video signals output from the switcher 301 are supplied to a Joint Photographic Coding Experts Group (JPEG) encoder block 310 built in an electronic program guide (EPG) data generating device 309.

The promotion-channel generating device 302 selects signals of two predetermined channels among the input broadcast channels and independently processes them. Also, input into the promotion-channel generating device 302 is bit map data to be transmitted, such as icons, station logos, category logos, and so on, which are generated by the EPG data generating device 309 under control of the program-transmitting control device 308 (this data may have been stored in a below-described integrated receiver/decoder (IRD) 2 shown in FIG. 20). The promotion-channel generating device 302 superimposes this bit map data on a video signal input from the switcher 301. The promotion-channel generating device 302 further outputs the processed data to a multiplexor (MUX) 304-1. A detailed explanation of the promotion-channel generating device 302 will be given below with reference to FIG. 2.

The MPEG video/audio encoder blocks 303-1 through 303-7 each contain five MPEG video/audio encoders for five channels in order to encode video signals and audio signals of the respective five broadcast channels. Accordingly, the MPEG video/audio encoder blocks 303-1 through 303-7 respectively encode input video data and audio data and output them to the corresponding multiplexors 304-2 through 304-8.

The JPEG video encoder block 310 built into the EPG data generating device 309 selects predetermined typical frames from video signals input from the switcher 301, under an instruction from the program-transmitting control device 308. The encoder block 310 then reduces each frame into a smaller size and further compresses the frame data into first EPG data (EPG1) which is then output to each of the multiplexors 304-1 through 304-8. Also fed to the multiplexors 304-2 through 304-8 is other EPG data (EPG2) generated by the EPG data generating device 309. The EPG2 includes EPG data that primarily contains text for a comparatively short period. Supplied to the multiplexor 304-1 is third EPG data (EPG3) primarily representing text for a period subsequent to the above-mentioned short period, as well as EPG2.

The multiplexor 304-1 multiplexes EPG1 through EPG3 with video data and audio data input from the promotion-channel generating device 302 and outputs the multiplexed data to a digital modulation circuit 305-1. The multiplexors 304-2 through 304-8 multiplex EPG1 and EPG2 with video data and audio data input from the MPEG video/audio encoder blocks 303-1 through 303-7, respectively, and output the multiplexed data to digital modulation circuits 305-2 through 305-8, respectively. The digital modulation circuits 305-1 through 305-8 perform digital-modulation on the input digital data according to a predetermined method (for example, Quadriphase Shift Keying (QPSK) method). Outputs of the digital modulation circuits 305-1 through 305-8 are allocated to respective satellite transponders (below-described transponders 1 through 8 shown in FIG. 12). A synthesizer circuit 306 synthesizes the outputs of the digital modulation circuits 305-1 through 305-8 and transmits the resulting data to a satellite via an antenna 307.

Figure 2:
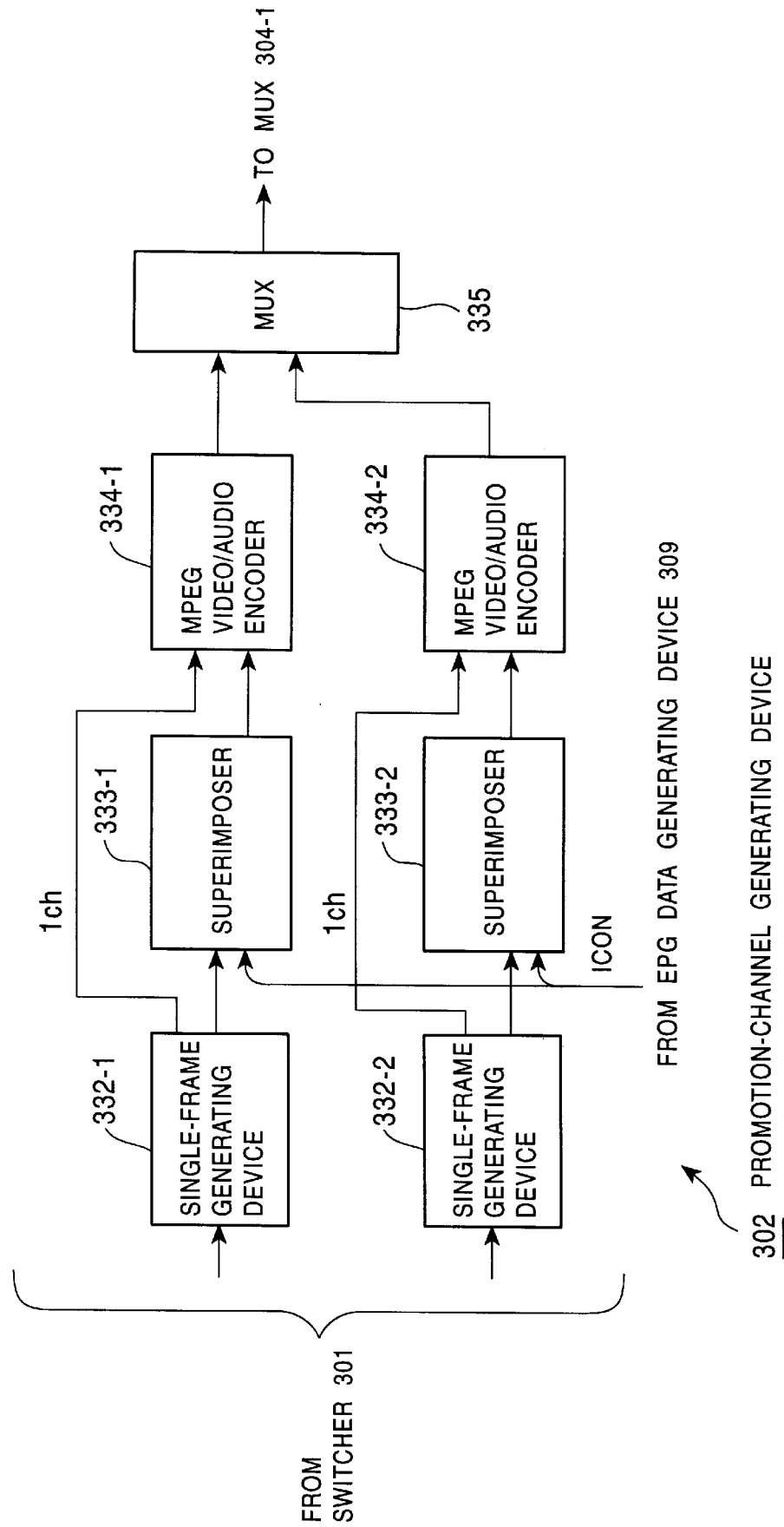
FIG. 2 is a block diagram of an example of the configuration of the promotion-channel generating device shown in FIG. 1.

FIG. 2 illustrates an example of the configuration of the promotion-channel generating device 302. Data concerning one broadcast channel output from the switcher 301 is processed as a single frame by a single-frame generating device 332-1. An output of the single-frame generating device 332-1 is input into a superimposer 333-1 in which the data is superimposed on the data supplied from the EPG data generating device 309. An output of the superimposer 333-1 is output to an MPEG video/audio encoder 334-1. Likewise, data on the other broadcast channel output from the switcher 301 is singly processed by a single-frame generating device 332-2 and then input into a superimposer 333-2 in which the data is superimposed on the data input from the EPG data generating device 309. The data output from the superimposer 333-2 is input into an MPEG video/audio encoder 334-2 and is encoded therein.

The two items of audio data representing the two channels incorporated into the single-frame generating devices 332-1 and 332-2 are encoded in the MPEG video/audio encoders 334-1 and 334-2, respectively. The resulting items of data are multiplexed in a multiplexor 335 and output to the multiplexor 304-1.

The European standards of the digital video broadcasts transmitted to receivers (IRD2 shown in FIG. 20) installed in households via satellite in the above-described manner have been summarized by Project Digital Video Broadcasting (DVB) formed of approximately 150 companies, mainly European broadcasters and manufacturers. This enables the receivers, in compliance with the standards, to produce frames of an electronic program guide from the EPG data transmitted as described above and to display them on a monitor.

Figure 3:
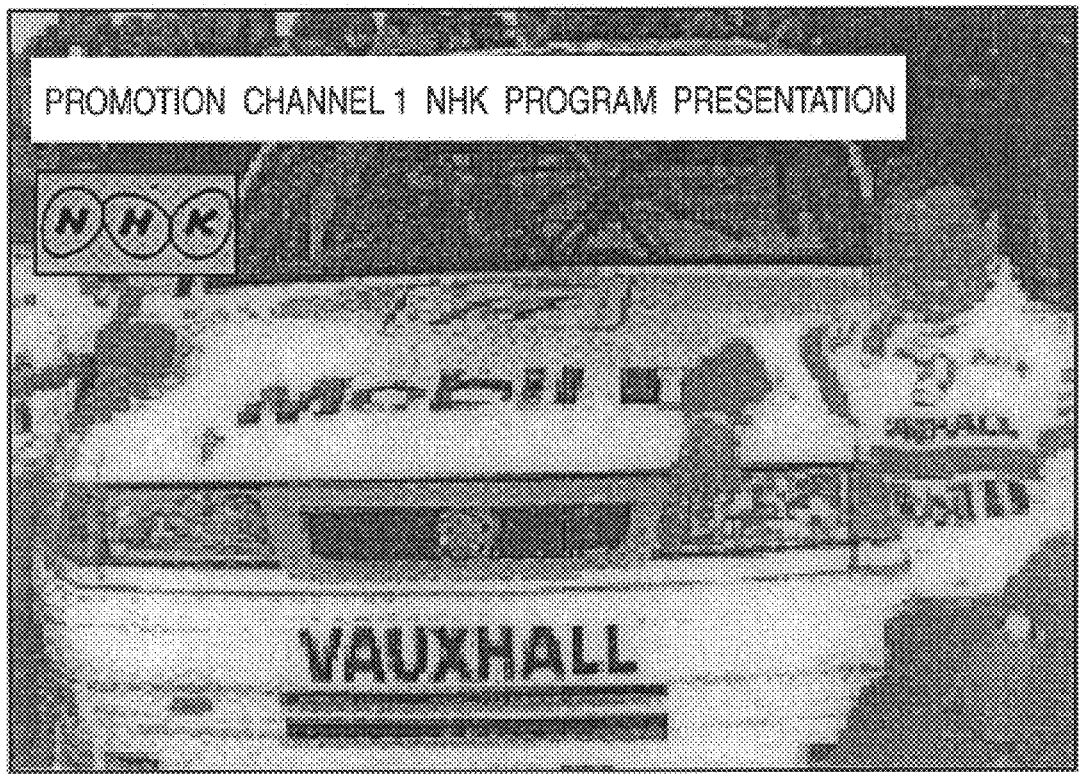
FIG. 3 illustrates a display example of the promotion channel.

The operation of the embodiment shown in FIGS. 1 and 2 will now be explained. Under control of the program-transmitting control device 308, the switcher 301 selects signals for two channels to be broadcast for promotion and outputs them to the promotion-channel generating device 302. The data indicating one channel output from the switcher 301 is subjected to predetermined processing in the single-frame generating circuit 332-1 and is then input into the superimposer 333-1. This single frame is targeted for presenting part of a predetermined program for promotion. FIG. 3 illustrates an example of a display for this promotion program.

The superimposer 333-1 superimposes this video data on the data input from the EPG data generating device 309. In the example of a display shown in FIG. 3, characters, such as "promotion channel 1 NHK", representing the item name displayed on the upper left, characters, such as "program presentations", representing the item description, and a logo ("NHK" in this embodiment) of the station broadcasting this program, are superimposed on the display. It should be noted that the station logo will be not superimposed if it is stored in the IRD 2. The output of the superimposer 333-1 is input into the MPEG video/audio encoder 334-1 and is encoded according to the MPEG2 method.

The data representing the other channel selected by the switcher 301 undergoes processing similar to the data indicating the above-described channel by the single-frame generating device 332-2, the superimposer 333-2, and the MPEG video/audio encoder 334-2. As a result, two promotion channels for introducing the programs in the single frames are generated in this embodiment.

The multiplexor 335 multiplexes the items of the promotion channel data formed of two single frames and outputs the multiplexed data to the multiplexor 304-1. The multiplexor 304-1 multiplexes the data input from the promotion-channel generating device 302 with the EPG data (EPG1 through EPG3) input from the EPG data generating device 309. The multiplexor 304-1 further forms the resulting data into a packet and outputs it. The digital modulation device 305-1 performs digital-modulation on the data input from the multiplexor 304-1. The modulated data is then allocated to a satellite guide transponder (the transponder 1 shown in FIG. 12).

Meanwhile, the MPEG video/audio encoder block 303-1 encodes video data and audio data for five broadcast channels input from the switcher 301 and outputs the respective coded data to the multiplexor 304-2. The multiplexor 304-2 forms the data for five broadcast channels and the EPG data (EPG1 and EPG2) into packets and multiplexes them. The resulting data is output to the digital modulation circuit 305-2. The modulated data is allotted to a first transponder (the transponder 2 illustrated in FIG. 12) among normal transponders.

Similarly, the multiplexors 304-3 through 304-8 form data for five broadcast channels encoded by the respective MPEG video/audio encoder blocks 303-2 through 303-7 and the EPG data (EPG1 and EPG2) into packets and multiplex them. The resulting items of data are input into the corresponding digital modulation circuits 305-3 through 305-8, respectively. The modulated items of data are allocated to the remaining six transponders (the transponders 3 through 8 shown in FIG. 12), respectively.

The synthesizer circuit 306 synthesizes the data output from the digital modulation circuits 305-1 through 305-8 and outputs it to a satellite via the antenna 307. The satellite processes this data by use of the eight transponders and transmits it to the respective receivers (IRD 2).

Figure 4:
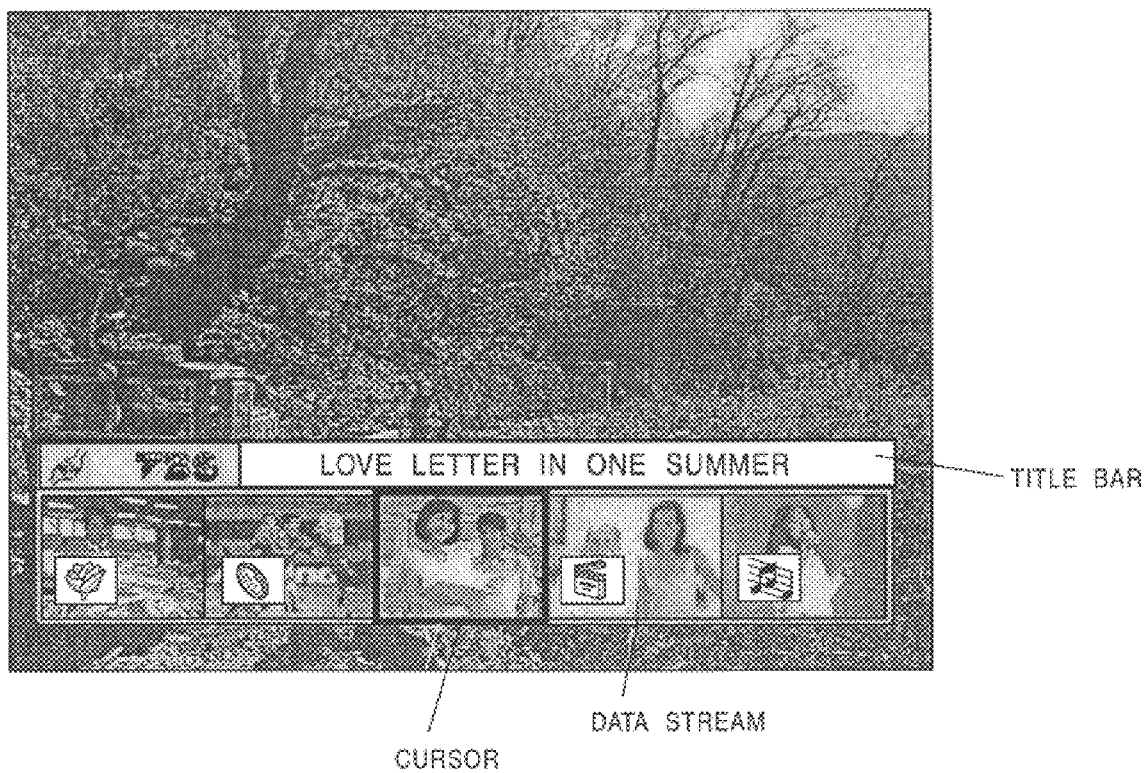
FIG. 4 illustrates a display example of a data stream.

An explanation will now be given of the EPG data (EPG1 through EPG3). In this embodiment, as will be described in greater detail below, when a program-table button switch 144 of a remote commander 5 (FIG. 24) is manipulated, a data-stream frame is superimposed on the original screen and displayed on a monitor 4 (FIG. 20), as illustrated in FIG. 4. This data stream is formed of a title bar and a program window, as illustrated in FIGS. 5 and 6, respectively.

Figure 5:
FIG. 5 illustrates the layout of a title bar.

As shown in FIG. 5, displayed in the title bar from the left are the category icon representing the category of the program, the station logo as the symbol of the station broadcasting the program, and the title of the program. On the other hand, in this embodiment, the program window is formed of still pictures obtained by reducing the size of the typical frames of five broadcast channels, as shown in FIG. 6. A category icon representing the category of the program is displayed on each reduced-size frame.

Figure 7:
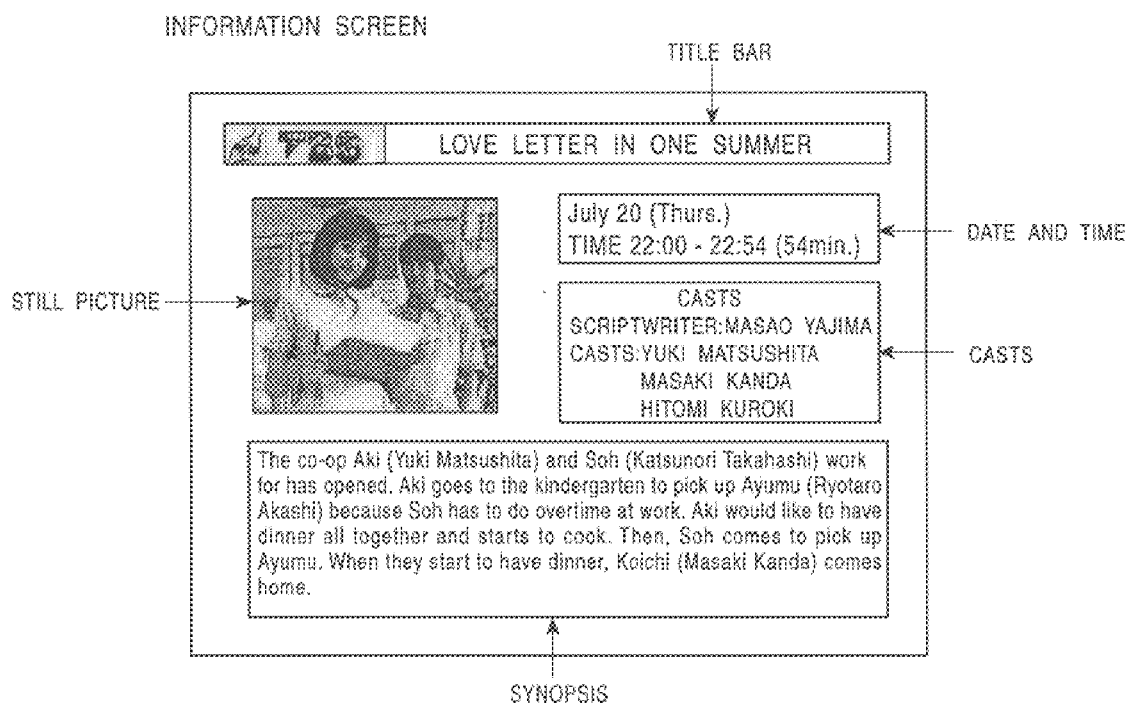
FIG. 7 illustrates a display example of an information frame.

Further, an information button switch 145 (FIG. 24) of the remote commander 5 is manipulated to display an information screen for further illustrating the program in detail, as shown in FIG. 7. The title bar, as well as the data stream shown in FIG. 4, is displayed on the uppermost position of this information screen. On the lower left of the title bar, the reduced-size frame of the typical still picture is displayed. Further displayed on the right of the still picture is the broadcast date and time and the casts (characters) of this program. A synopsis of this program is displayed at the bottom of the screen.

Figure 6:
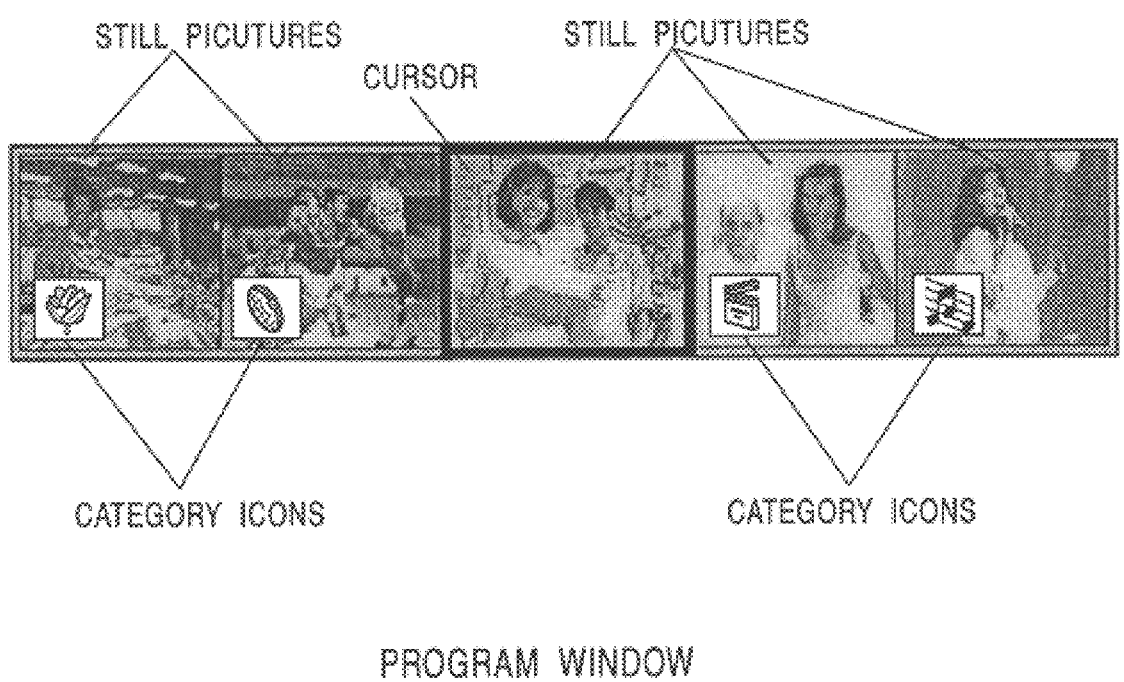
FIG. 6 illustrates the layout of a program window.

EPG1 represents still-picture data forming the program window shown in FIG. 6, while EPG2 and EPG3 indicate data concerning the title, broadcast date and time, casts, and the synopsis of the program. EPG2 is concerned with programs to be broadcast in the near future, while EPG3 relates to programs to be broadcast in the distant future. EPG1 through EPG3 are displayed as on-screen display (OSD) data.

Figure 9:
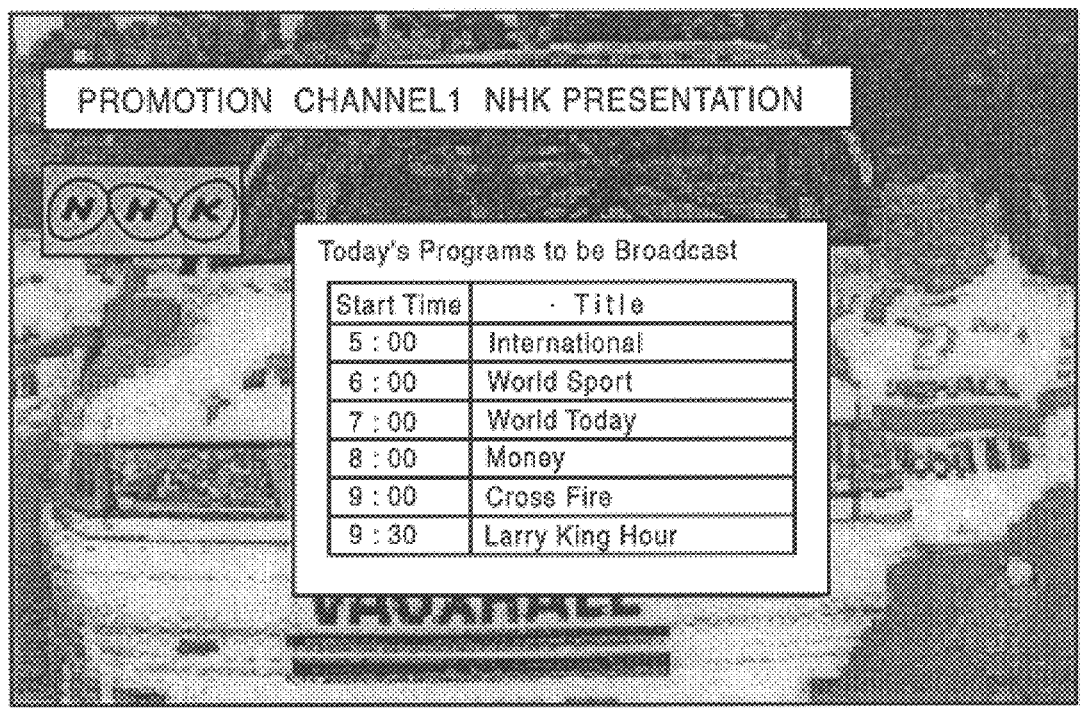
FIG. 9 illustrates a display example of a channel program table.
Figure 10:
FIG. 10 illustrates a display example of a detailed program explanation (program content)

FIGS. 8 through 10 illustrate examples of an electronic program guide displayed by a receiver (IRD2 shown in FIG. 29) that is able to primarily process only characters (letters) as OSD (in other words, unable to process still pictures) and display them. FIG. 8 illustrates an electronic program guide for all the channels (entire program table) in which the names of broadcast stations are shown in columns and times are indicated in rows. At the position defined by a predetermined column and row, the title of the program to be broadcast by the corresponding broadcast station and time is displayed. On the other hand, FIG. 9 illustrates a display example of an electronic program guide of a station (channel program table). In this example, the titles and the start time of the programs on the channel are displayed in the direction from top to bottom.

The entire program table shown in FIG. 8 and the channel program table illustrated in FIG. 9 are minimum information (brief explanation for the program) required for selecting a desired program. In contrast, as shown in FIG. 10, the information (detailed explanation for the program) for commenting on a predetermined program (or a predetermined broadcast station or broadcast channel) is not essential but can be used as a reference for selecting the program. Accordingly, the detailed program explanation is also transmitted as EPG data.

Figure 11A:
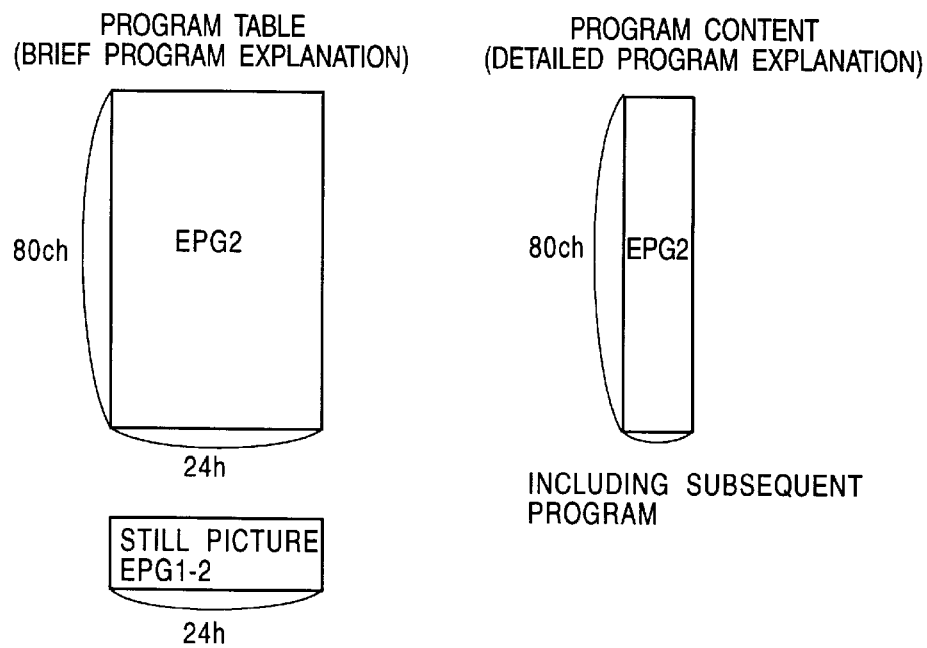
FIG. 11, which is formed of FIGS. 11A and 11B, illustrates the program table and the program content.

If both the program table (brief program explanation) and the program content (detailed program explanation) are transmitted from the individual transponders for a long period, the transmission rate of video data and audio data to be essentially transmitted would be hampered. For overcoming this drawback, the following measures are taken. Transmitted to the transponders (multiplexors 304-2 through 304-8) of the channels for transmitting normal programs are, as illustrated in FIG. 11A, program table data containing a maximum of 80 broadcast channels for a 24-hour period, and program-content data concerning programs currently being aired as well as the subsequent program for 80 broadcast channels, as EPG2 transmitted from the EPG data generating device 309. This can prevent a deterioration in the transmission rate of video signals and audio data to be essentially transmitted. The above-described 80 channels are calculated assuming that 10 channels are allotted to each transponder, and 8 transponders are allocated to one satellite. However, 37 channels (=5×7+2) are applied to the embodiment shown in FIG. 1.

Figure 11B:
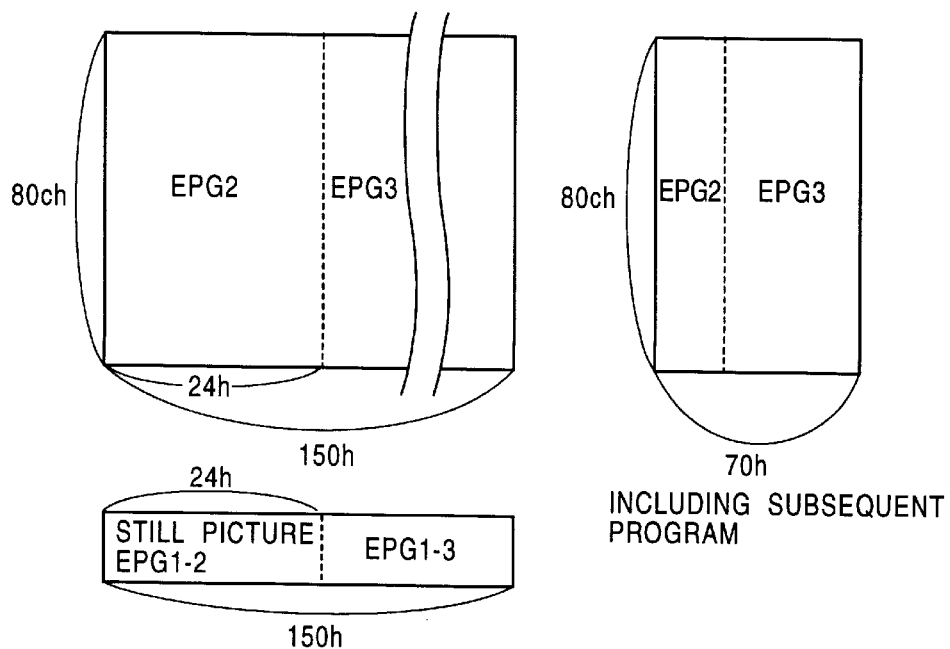

The transmission channel (the channel corresponding to the digital modulation circuit 305-1) of the promotion-channel generating device 302 is used largely for transmitting promotion-oriented programs, such as introductions for programs broadcast on other transmission channels (transmission channels corresponding to the digital modulation circuits 305-2 through 305-8), recommended programs, promotion of program providers, etc. In other words, priority is given to the channel of the promotion-channel generating device 302 for transmitting the above-described programs. Accordingly, the transponder (guide transponder) for transmitting information concerning the promotion channel transmits very few normal programs, unlike the normal transponders, and is thus able to transmit a greater amount of program-table data and program-content data. Hence, program-table data and program-content data covering a longer period are transmitted as EPG3 from the EPG data generating device 309 to this promotion channel, as shown in FIG. 11B. In this embodiment, the program-table data contains data for 150 hours, while the program-content data includes data for 70 hours. As a consequence, as illustrated in FIG. 12, program-table data for 150 hours and program-content data for 70 hours of the individual 80 broadcast channels are transmitted to the guide transponder (transponder 1). In contrast, program-table data for 24 hours and program-content data representing current and subsequent programs on the 80 broadcast channels are transmitted to normal transponders (transponders 2 through 8). Since still-picture data (data stream) is essential for selecting the program, as shown in FIG. 11, the still-picture data for 24 hours (EPG1-2) is transmitted to the normal transponders and the data for 150 hours (EPG1-2 and EPG1-3) is transmitted to the guide transponder, as well as the program table (brief program explanation).

The EPG data will now be described in detail. The EPG data, as well as other types of accessory data, is transmitted in a DVB system as one type of service information (SI). Data required for producing an electronic program table from this EPG data is shown in FIG. 13. The service provider for specifying the provider for the service (broadcast channel), the service name representing the name of the service, the service type indicating the type of the service are described in Service Description Table (SDT) in the EPG data. In this service type, a description is given whether the type of the service is a single frame (promotion_service). The title of the program is defined as event_name of the Short Event Descriptor of Event Information Table (EIT). The subtitle (type) is described in Component Descriptor of the EIT. The current date and time is defined as UTC_time in the Time and Date Table (TDT). The program start time is described as start_time of the EIT. The program duration is described as duration of the EIT. Further, for programs for people only over a certain age, the Parental Rate specifying the age is described in Parental Rating Descriptor of the EIT. The video mode is described in Component Descriptor of the EIT. The provide language is described in Language Descriptor of ISO639 of the Program Map Table (PMT). The provide sound mode is described in Component Descriptor of the EIT. The category is described in Content Descriptor of the EIT.

The brief program explanation, such as the casts shown in FIG. 7, and the entire program table and the channel program table illustrated in FIGS. 8 and 9, respectively, are described in the Short Event Descriptor of the EIT. On the other hand, the detailed program explanation, such as the content explanation shown in FIG. 7 and the program information shown in FIG. 10, is described in the Extended Event Descriptor of the EIT. Moreover, the promotion information, such as the item name (promotion channel 1, NHK), the item content (program introduction), and the station logo (NHK), illustrated in FIG. 3, is described in Promotion Descriptor of the SDT.

Figure 14:
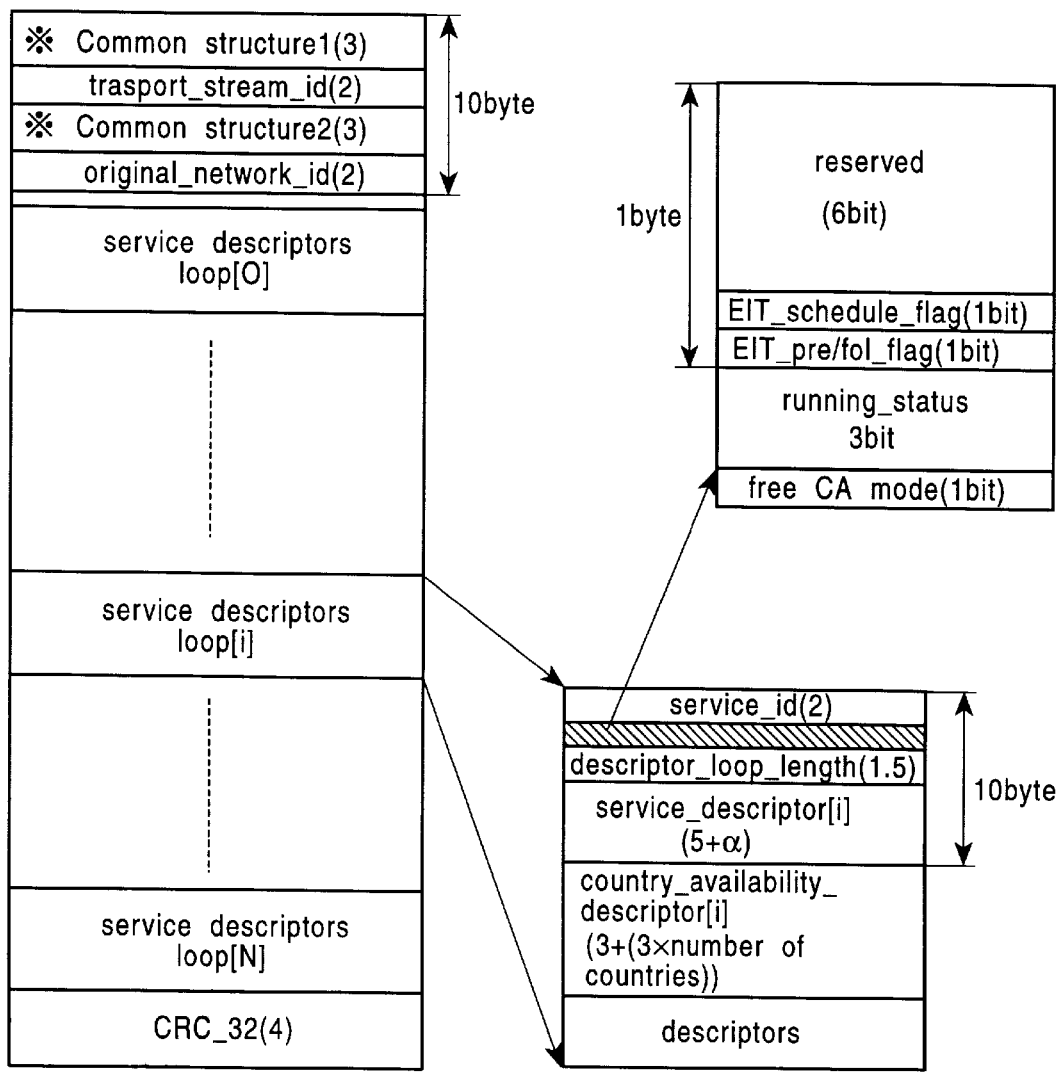
FIG. 14 illustrates the arrangement of the Service Description Table (SDT)

FIG. 14 illustrates the layout of the SDT. The SDT includes the data representing the services in the system, such as the service name, the service provider, etc. The number in parentheses in FIG. 14 represents the number of bytes. The leading 10 bytes are used as a header that is formed of common structure 1(3), transport stream ID (transport_stream_id(2)), common structure 2(3), and original network ID (original_network_id(2)). The transport stream ID provides a label for distinguishing the transport stream to which the information is given from the SDT from the other transport streams multiplexed in the same delivery system. The original network ID is a label for identifying the network ID serving as the generation source of the delivery system.

Subsequent to the header, service descriptors loop [O] through service descriptors loop [N] are disposed, and finally, error-correcting CRC_32(4) is located. Each service descriptors loop includes service_id(2), EIT_schedule_flag, EIT_present/following_flag, running_status, and free_CA_mode. The service_id provides a label for distinguishing the service from the other services in the same transport stream. The service_id is equivalent to the program number (program_number) in the corresponding program map section (program map_section). The EIT_schedule_flag indicates the presence or the absence of the EIT_schedule information in its own transport stream. The EIT_present/following_flag represents the presence or the absence of the EIT_present/following information in its own transport stream. The running_status designates the status of the service, such as whether the service has not yet started, is beginning to start in a few minutes (required for setting up a VCR for recording), has already started, or is currently suspended. The free_CA_mode indicates whether the service can be accessed free of charge or is controlled by a conditional access system.

Subsequent to the free_CA_mode, the descriptor_loop_length is disposed to designate the overall byte length of subsequent descriptors. The adjacent service_descriptor [i] supplies the name of service_provider and the service name in text format, as well as the service_type. The subsequent country_availability_descriptor[i] represents a list of the countries that can access the service and a list of the countries that cannot access it. The subsequent descriptors include the above-described promotion descriptor.

Figure 15:
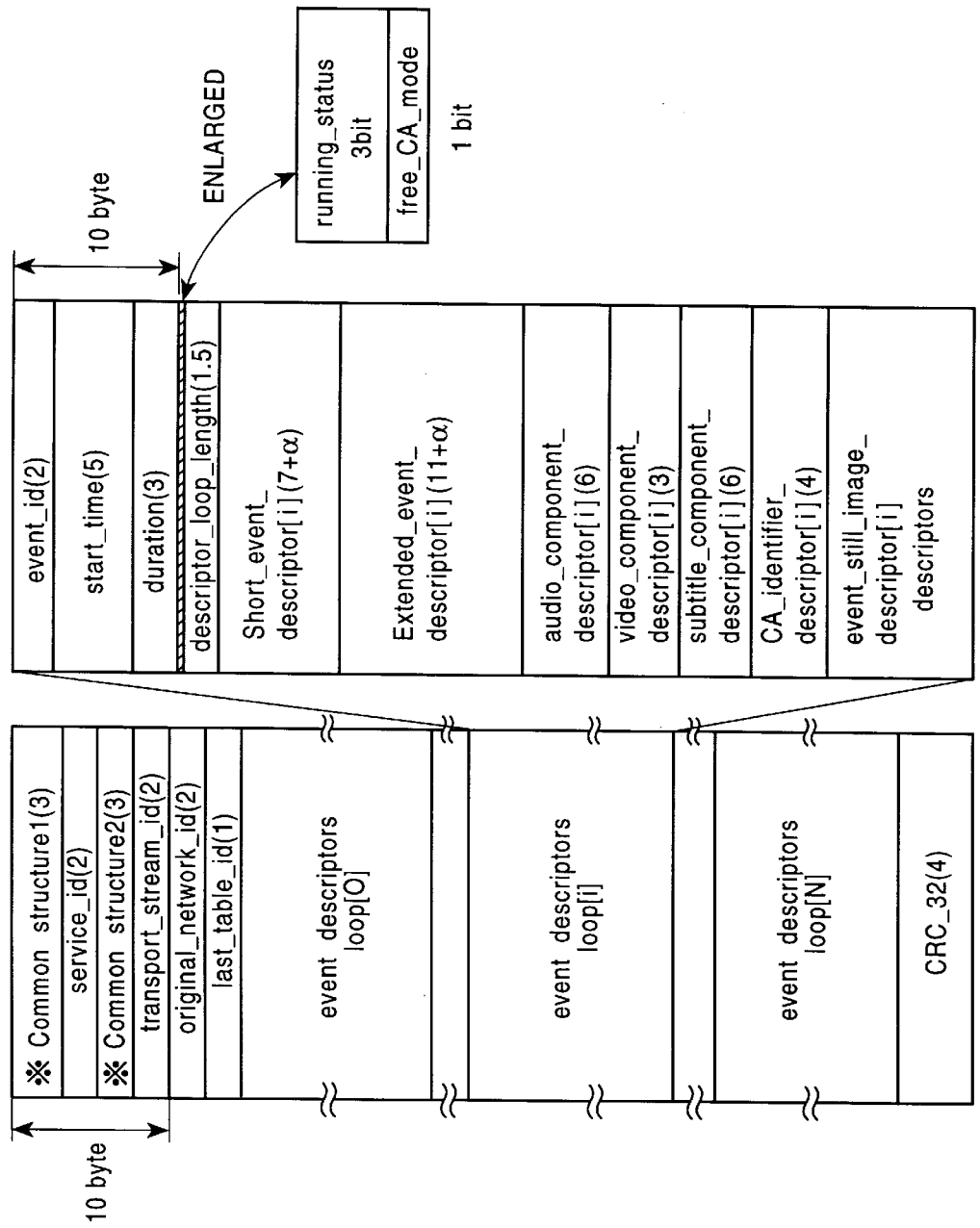
FIG. 15 illustrates the arrangement of the Event Information Table (EIT)

FIG. 15 illustrates the layout of the EIT. The leading 10 bytes are used for the header that contains common structure 1(3), service_id(2), common structure 2(3), and transport_stream_id(2). Next to the header, original_network_id(2) is located, and last_table_id(1) is further positioned. The last-table-id(1) identifies the final (=maximum) table_id. If only the single table is used, the table_id of the table is set. If table-id takes consecutive values, the information is stored by chronological order. Thereafter, event descriptors loop [O] through event descriptors loop[N] are disposed, and finally, CRC_32(4) is provided.

Event descriptors each include event_id(2) providing the identification number of the event to be described, and start_time (5) for displaying the start time of the event in the form of the Coordinate Universal Time (UTC) and the Modified Julian Day (MJD). In this field, 16 least significant bits (LSB) of the MJD-displayed data is provided, and six digits for subsequent 24 bits are represented by use of the four-bit binary-coded decimal (BCD). For example, 93/10/12 12:45:00 can be coded as 0XC078124500. The following duration (3) represents the duration of the event (program) by hour, minute and second. Thereafter, the running_status, free_CA_mode, descriptor_loop_length (1.5) are arranged. Then, Short_event_descriptor[i] (7+α) is disposed to provide the event name and short description of the event (program table) in the text format. The following Extended_event_descriptor[i](11+α) provides a more detailed description of the event (program content) than the description supplied by the Short event descriptor.

Further described are audio_component_descriptor[i] (6), video_component_descriptor[i] (3), and subtitle_component_descriptor[i] (6). The subsequent CA-identifier_descriptor[i] (4) describes whether the event is scrambled, whether restricted reception, such as charged reception, is conditioned, and so on. Finally, the other descriptors, such as event_still_image_desciptor[i] for recording the data of the program window (still-picture data) shown in FIG. 6, are described.

Figure 16:
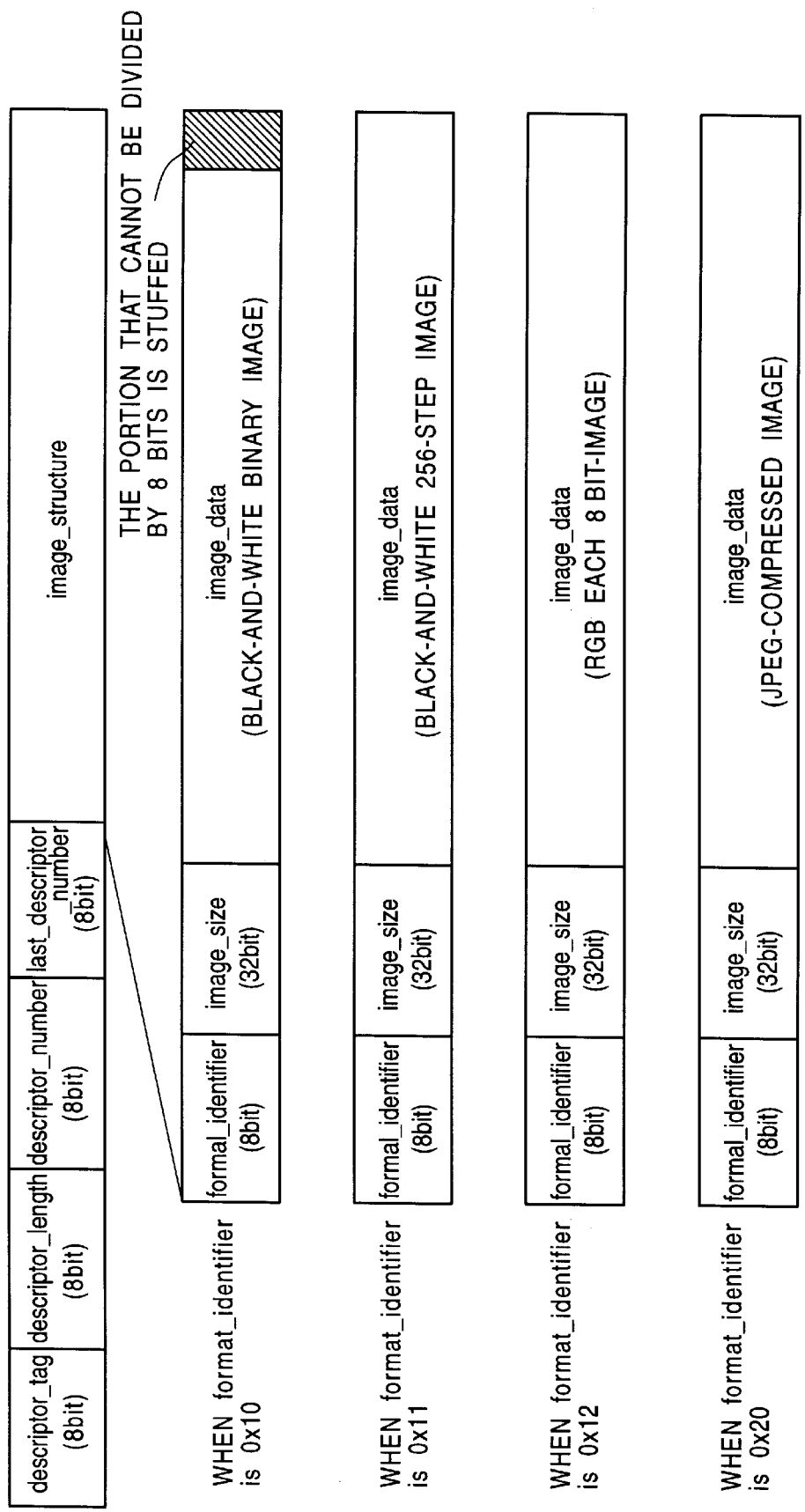
FIG. 16 illustrates the format of a still picture.

FIG. 16 illustrates the format of this event_still_image_descriptor[i] (still-picture format). As shown in FIG. 16, the 8-bit descriptor_tag representing that this type of information is still-picture data is disposed as the leading data. Then, 8-bit descriptor_length indicating the overall format length is provided. Subsequently, 8-bit descriptor_number and 8-bit last-descriptor_number are sequentially disposed to designate the number of the descriptor and the number of the last (maximum) descriptor, respectively. Finally, image_structure as substantial image data of the still picture is positioned. This image_structure is formed of 8-bit format_identifier, and 32-bit image_size and image_data. The format_identifier represents the ID of the image_data. When the format_identifier is 0×10, image_data is identified as black-and-white binary image data. If the format_identifier is 0×11, image_data is determined as black-and-white 256-level image data. If the format_identifier is 0×12, image_data is set as Red (R) Green (G) and Blue (B) image data, each color being formed of 8 bits. When the format_identifier is 0×20, image_data is identified as image data compressed by the JPEG method. In the embodiment shown in FIG. 1, the reduced-size frame forming the program window is compressed by the JPEG method, the format_identifier results in 0×20. When the image_data is binary black-and-white image data, it sometimes cannot be divided by 8 bits, in which case, dummy data is stuffed. The image_size represents the size of the image_data.

Figure 17:
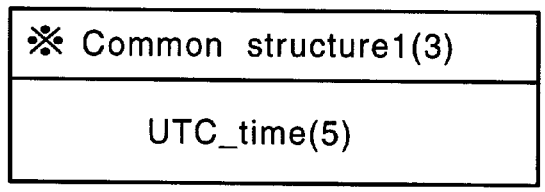
FIG. 17 illustrates the arrangement of the Time and Data Table (TDT)

FIG. 17 illustrates the layout of the TDT. The TDT is formed of common structure 1(3) and UTC_time(5). In addition to the above-described tables, the Service Information (SI) includes Program Association Table (PAT) shown in FIG. 18 and Program Map Table (PMT) illustrated in FIG. 19.

Figure 18:
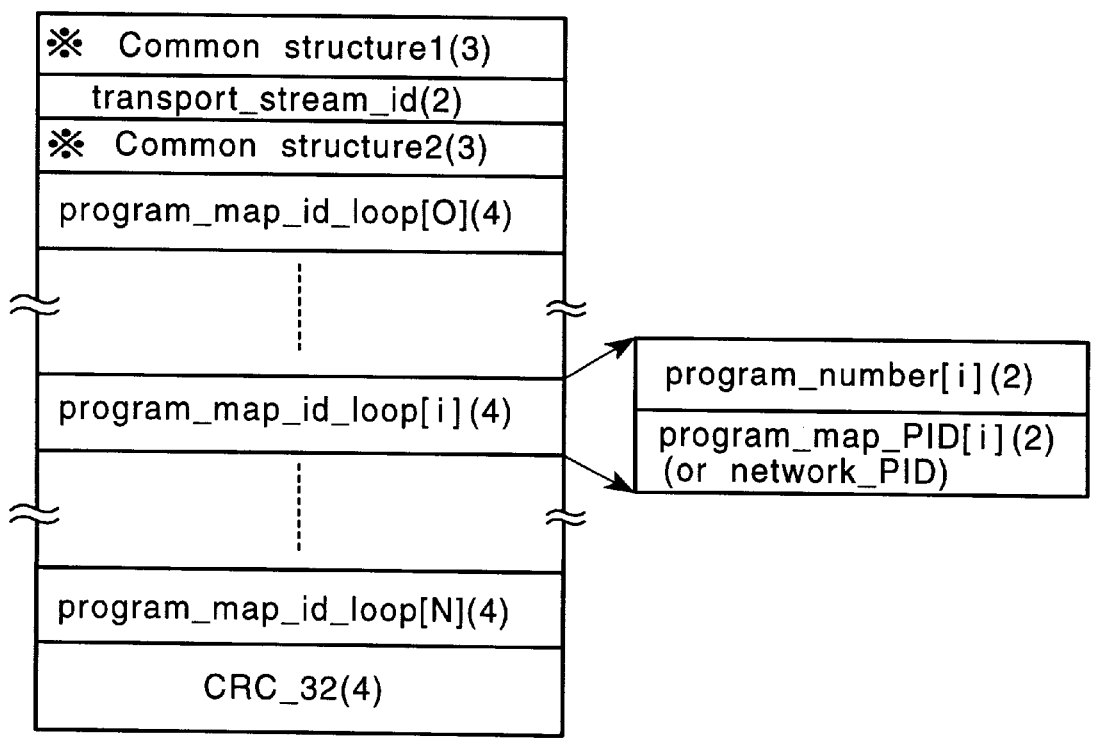
FIG. 18 illustrates the configuration of the Program Association Table (PAT)

The PMT includes, as shown in FIG. 18, common structure 1(3), transport_stream_id(2), common structure 2(3), program_map_id_loop[O] (4) through program_map_id_loop[N] (4), and finally CRC_32(4). Each program_map_id_loop[i] (4) is constituted of program_number[i] (2) and program_map_PID[i] (2) (or network_PID). The program_number represents the program to render the corresponding program_map_PID effective. When the program_number is set to be 0×0000, the PID to be subsequently referred acts as network_PID. The values of the program_number other than 0×0000 are defined by the user. In this field, the same value can never be taken in 1 version of the PAT. For example, the program_number is used for specifying the broadcast channel. The network_PID defines the PID of a transport stream packet including the Network Information Table (NIT). Although the value of the network_PID can be defined by the user (0×0010 in the DVP), it cannot take a value reserved for another use. The presence of the network_PID is optional. The program_map_PID specifies the PID of a transport stream packet containing the effective PMT for the program defined by the program_number. Two or more program_map_PID cannot be allocated to the program_number. Although the value of the program_map_PID can be specified by the user, it cannot take a value reserved for another use.

Figure 19:
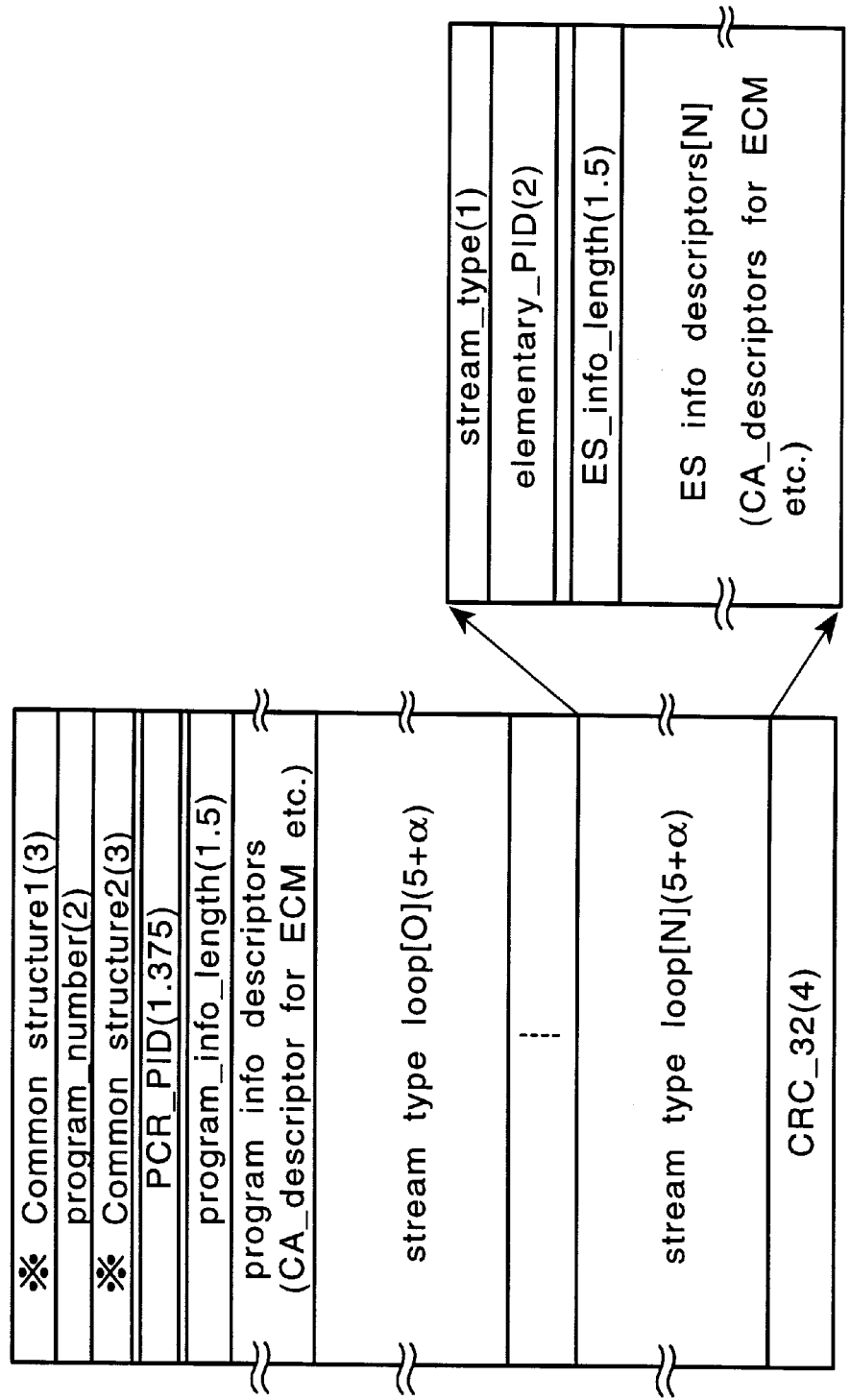
FIG. 19 illustrates the arrangement of the Program Map Table (PMT)

As illustrated in FIG. 19, the 10-byte header formed of common structure 1(3), program_number(2), common structure 2(3), and PCR_PID(1.375) is first positioned at the PMT. The PCR_PID indicates the PID of a transport stream packet including the program clock reference (PCR) field effective for the program defined by the program_number. If there is no PCR related to the defined program with respect to the private stream, this field takes the value of 0×1FFF. Subsequently, program_info_length(1.5) is located to specify the byte number of the following descriptor. In the subsequent program info descriptors, CA_descriptor, Copyright_descriptor, Max_bitrate_descriptor, etc. are described. Then, stream type loop[0] (5+α) through stream type loop[N] (5+α), and CRC_32(4) are disposed. Each stream type loop has stream_type(1) and elementary_PID(2). The stream_type defines the type of the payload or the elementary stream transmitted in a packet having a PID specified by the elementary_PID. The value of the stream_type is defined by MPEG2. The elementary_stream_PID specifies the PID of the related elementary stream and the PID of a transport stream packet transmitting data. Subsequent to the elementary_PID, 12-bit ES_info_length(1.5) is positioned: the first two bits are 00, and after this field, the byte number of the descriptor of the following related elementary stream is defined. Then, ES info descriptors[N] in which CA_descriptor and other descriptors are described are specified.

Figure 20:
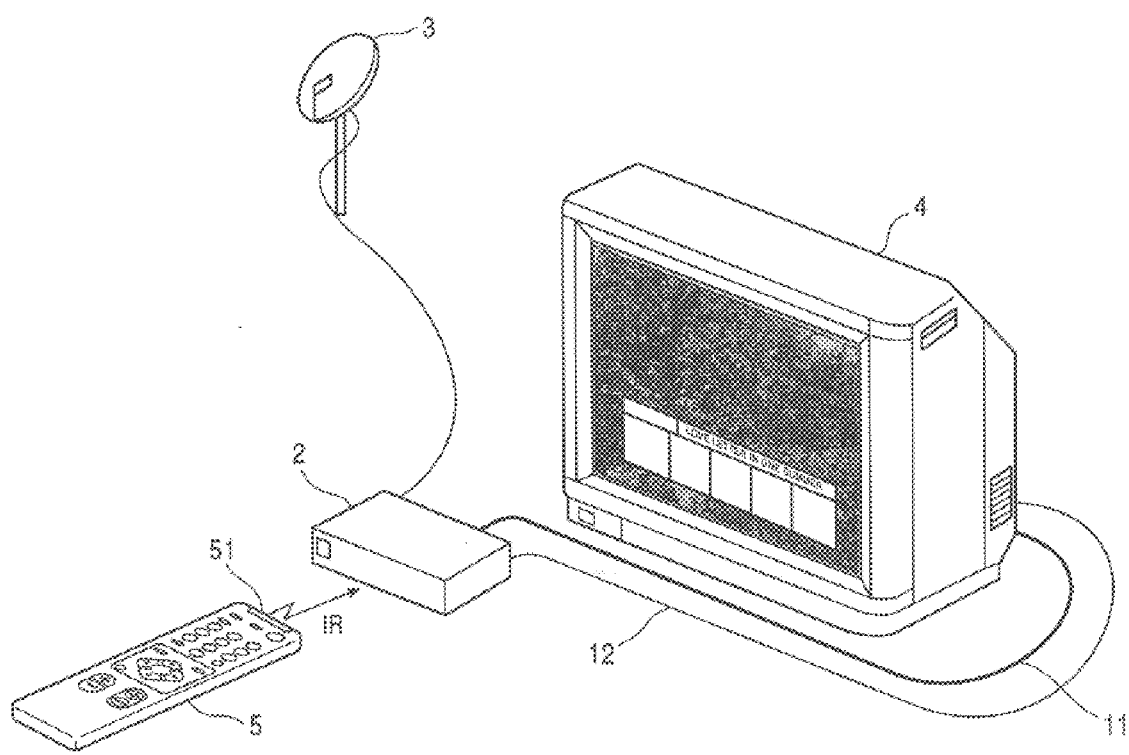
FIG. 20 is a perspective view of an example of the construction of an audio video (AV) system formed by the application of the present invention.
Figure 23:
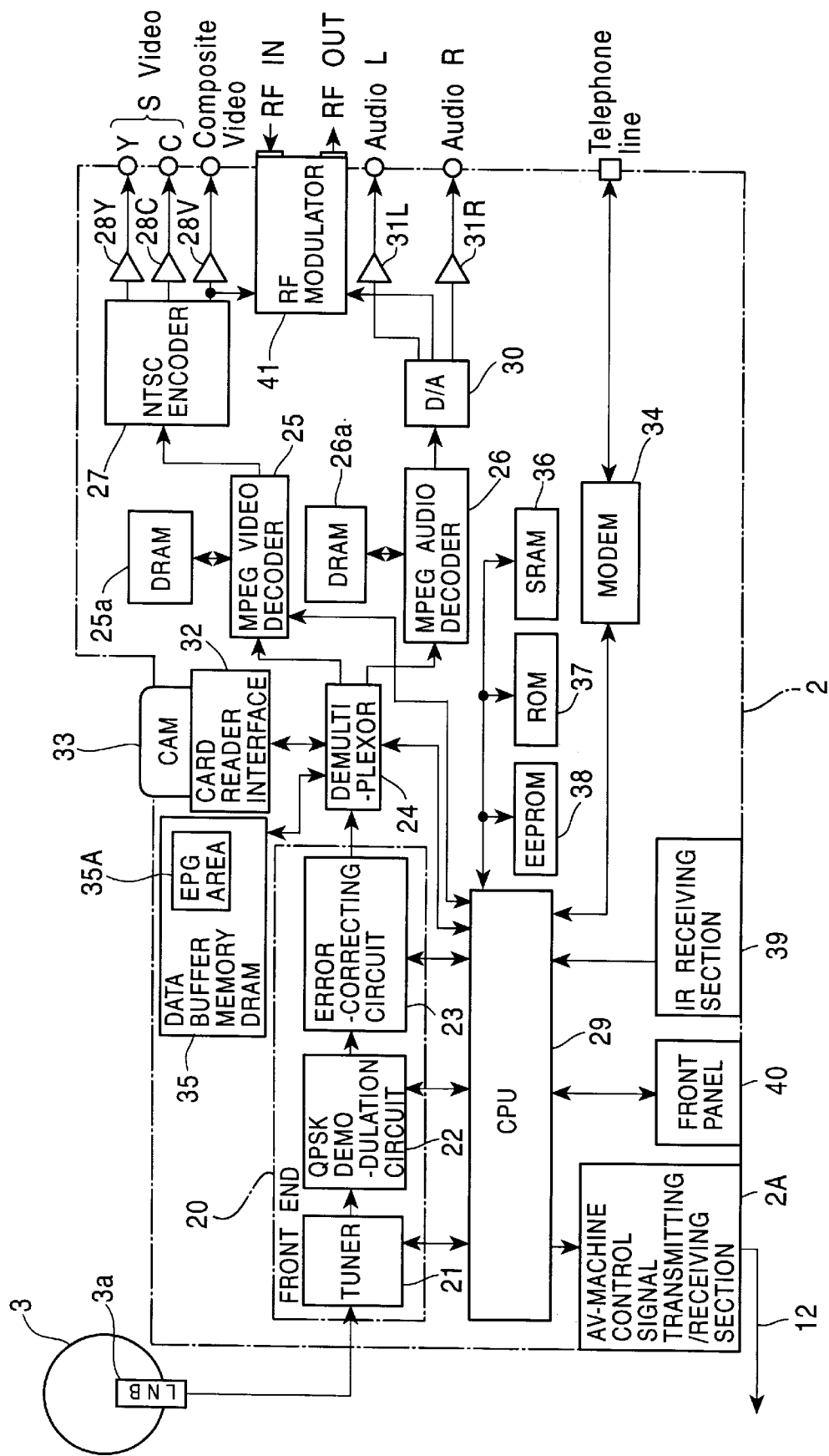
FIG. 23 is a block diagram of an example of the internal configuration of the IRD shown in FIG. 20.

FIG. 20 illustrates an example of the construction of an audio video (AV) system formed by the application of the present invention. In this embodiment, an AV system 1 is formed of an integrated receiver/decoder (IRD) 2 and a monitor 4. The IRD 2 decodes a signal obtained by receiving radio waves transmitted from the transmitting apparatus shown in FIG. 1 by a parabolic antenna 3 via a satellite (a broadcasting satellite or a communication satellite) (not shown). The monitor 4 and the IRD 2 are interconnected to each other through an AV line 11 and a control line 12. Commands can be input into the IRD 2 by transmitting an infrared ray (IR) signal from a remote commander 5. More specifically, a predetermined button switch of the remote commander 5 is manipulated, whereby a corresponding IR signal is transmitted from an IR-transmitting section 51 and is sent to an IR-receiving section 39 of the IRD 2 (FIG. 23).

Figure 21:
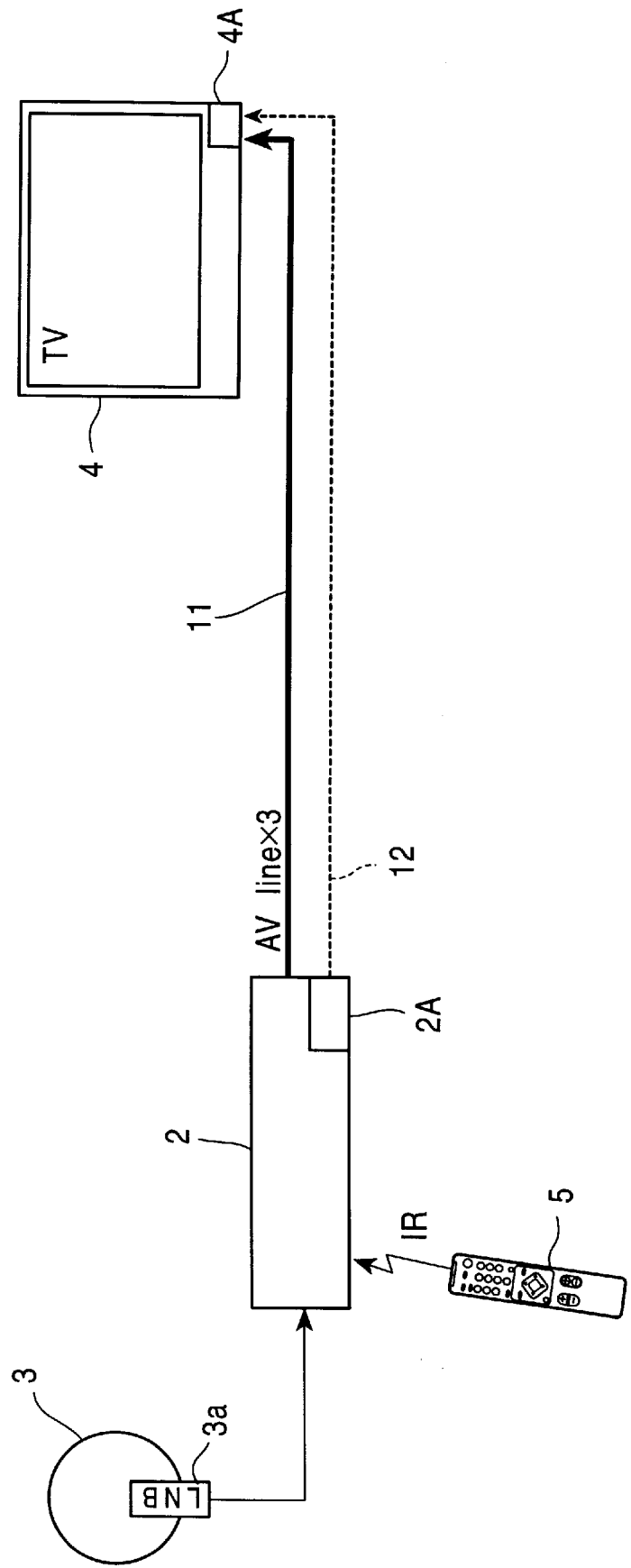
FIG. 21 is a block diagram of the electrical connection of the AV system shown in FIG. 20.

FIG. 21 illustrates the state of an electrical connection of the AV system 1 shown in FIG. 20. The parabolic antenna 3 has a low noise block downconverter (LNB) 3a so as to convert a signal from a satellite into a signal having a predetermined frequency and to supply it to the IRD 2. The IRD 2 then supplies its output to the monitor (display means) 4 via the AV line 11 formed of, for example, three lines, such as a composite video signal line, an audio L signal line, and an audio R signal line. Further, the IRD 2 and the monitor 4 have AV-machine control signal transmitting/receiving sections 2A and 4A, respectively. The transmitting/receiving sections 2A and 4A are interconnected to each other by a control line 12 formed of a Wired Sony Infrared Remote Control System (SIRCS).

Figure 22:
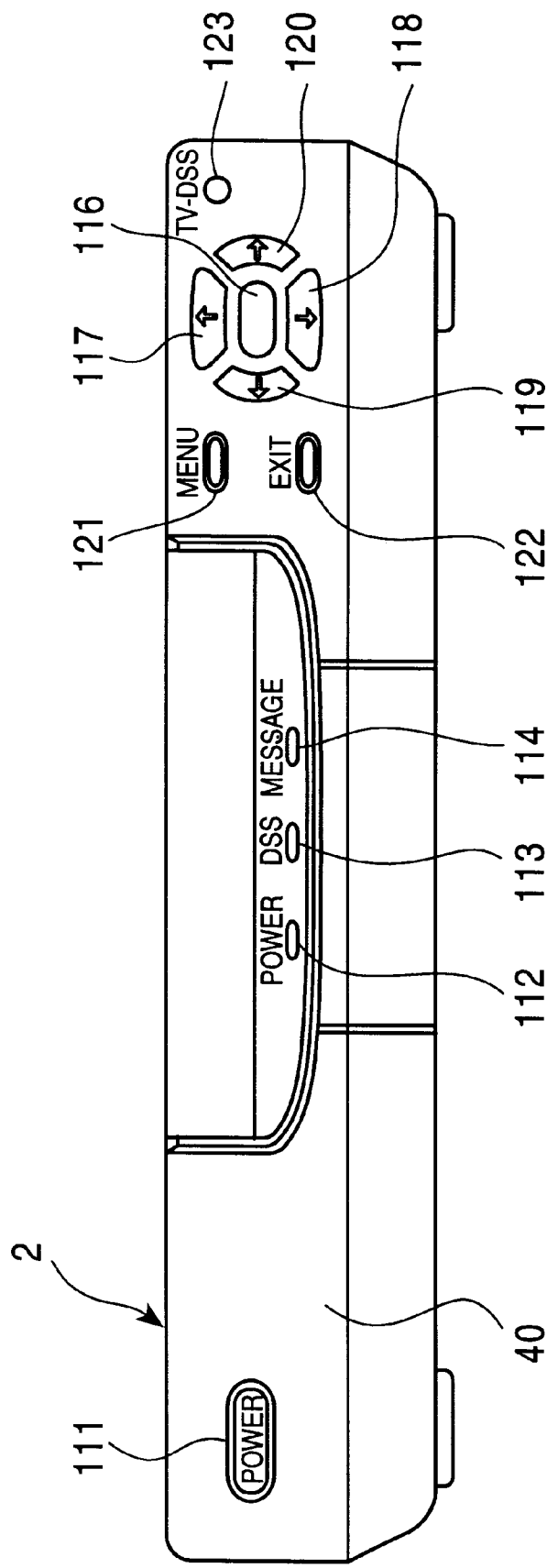
FIG. 22 is a front view of an example of the construction of the integrated receiver/decoder (IRD) shown in FIG. 20.

FIG. 22 is a front view illustrating an example of the layout of the IRD 2. A power-supply button switch 111 is disposed at the left corner of the IRD 2. This button switch 11 can be manipulated by turning power supply on or off. The power is turned on to light up a light-emitting diode (LED) 112. An LED 113 located adjacent to the LED 112 in the right direction can be manipulated by pressing a TV/DSS changeover button switch 123. More specifically, the LED 113 is lit up when a digital satellite system (DSS) mode is set, while it goes out when the TV mode is set. The DSS mode is used for receiving radio waves transmitted via a satellite according to the above-described method, while the TV mode is used for receiving ground waves of television broadcasts. An LED 114 is lit up when a predetermined message is transmitted to the IRD 2 via a satellite. When the user recognizes this message output and displayed onto the monitor 4, the LED 114 goes out.

A menu button switch 121 is manipulated to display menus on the monitor 4. An exit button switch 122 is pressed to erase the OSD data. A cursor-up button switch 117, a cursor-down button switch 118, a cursor-left button switch 119 and a cursor-right button switch 120 are disposed around a select button switch 116 in the upper, lower, left and right directions, respectively. These buttons 117, 118, 119 and 120 are manipulated to shift the cursor in the upper, lower, left and right directions, respectively. The select button switch 116 is pressed to fix the selection.

FIG. 23 is an example of the internal configuration of the IRD 2 when receiving signals in the above-described DSS mode. A radio frequency (RF) signal output from the LNB 3a of the parabolic antenna 3 is supplied to a tuner 21 of a front end (receiving means) 20 and is demodulated. An output of the tuner 21 is fed to a QPSK demodulation circuit 22 and is QPSK-demodulated therein. An output of the QPSK demodulation circuit 22 is supplied to an error-correcting circuit 23 in which errors are detected and corrected as required. A key required for a deciphering operation, as well as a decipher program, is stored in a conditional access module (CAM) 33 formed of an IC card having a CPU, ROM, RAM and so on. A key and decipher processing are required to decipher any ciphered signal transmitted via a satellite. Accordingly, the key is read from the CAM 33 via a card reader interface 32 and is supplied to a demultiplexor 24. The demultiplexor 24 deciphers the ciphered signal with the use of this key. The CAM 33 stores payment information in addition to the key and the decipher program required for the deciphering operation.

The demultiplexor 24 receives a signal output from the error-correcting circuit 23 of the front end 20 and temporarily stores it in a data buffer memory (dynamic random access memory (DRAM)) or a static random access memory (SRAM) 35. The demultiplexor 24 reads the signal as required and supplies the ciphered video signal to an MPEG video decoder 25. The ciphered audio signal is further fed to an MPEG audio decoder 26. The MPEG video decoder 25 stores an input digital video signal in a DRAM 25a as required and performs a decoding operation on the video signal compressed according to the MPEG method. The decoded video signal is supplied to an NTSC encoder 27 and is converted into a luminance signal (Y), a chroma signal (C) and a composite signal (V) according to the NTSC method. The luminance signal (Y) and the chroma signal (C) are output as an S video signal through buffer amplifiers 28Y and 28C, respectively. The composite signal (V) is, on the other hand, output through a buffer amplifier 28V. As the MPEG video decoder 25, MPEG2 decoding LSI (STi3500) manufactured by SGS-Thomson Microelectronics Ltd. may be used. The outline of this product is introduced in, for example, *Nikkei Electronics*, Nikkei Business Publications, Inc. Mar. 14, 1994 (no. 603), page 101 to 110, by Mr. Martin Bolton. Further, the MPEG2-Transportstream is explained in the *Latest MPEG Textbook*, ASCII Corporation, Aug. 1, 1994, page 231 to 253.

The MPEG audio decoder 26 stores the digital audio signal supplied from the demultiplexor 24 in a DRAM 26a as required and performs a decoding operation on the audio signal compressed according to the MPEG method. The decoded audio signal is digital-to-analog converted in a digital-to-analog (D/A) converter 30; an audio signal component on the left channel is output via a buffer amplifier 31L, while an audio signal component on the right channel is output via a buffer amplifier 31R. An RF modulator 41 converts the composite signal output from the NTSC encoder 27 and the audio signal output from the D/A converter 30 into an RF signal and outputs it. Moreover, when the TV mode is set, the RF modulator 41 allows the RF signal of the NTSC method input from an AV machine, such as a cable box or the like, to pass through the modulator 41 and to be directly output to a VCR or another AV machine (not shown). In this embodiment, the video signal and the audio signal are fed to the monitor 4.

A central processing unit (CPU) 29 executes various types of processing according to a program stored in a ROM 37 so as to control, for example, the tuner 21, the QPSK demodulation circuit 22, the error-correcting circuit 23 and so on. Additionally, the CPU 29, controlling the AV-machine control signal transmitting/receiving section 2A, transmits a predetermined control signal to another AV machine (the monitor 4 in this embodiment) and receives a control signal from another AV machine via the control line 12. The operational button switch on a front panel 40 (FIG. 22) can be pressed to directly input a predetermined command to the CPU 29. Also, the remote commander 5 (FIG. 24) is manipulated to send an infrared-ray (IR) signal from the infrared-ray (IR) transmitting section 51. The IR signal sent from the IR-transmitting section 51 is received by the IR-receiving section 39, and the receiving results are fed to the CPU 29. In this manner, a predetermined command may also be input to the CPU 29 by manipulating the remote commander 5.

The demultiplexor 24 captures EPG data, as well as the MPEG video data and audio data supplied from the front end 20, and feeds it to an EPG area 35A of the data buffer memory 35 and stores it therein. The EPG information is concerned with the programs of the individual channels (for example, channels, broadcast time, titles and categories of the programs, in addition to still pictures of the programs) for 24 hours from the current time (EPG2 and EPG1-2) or the programs of the individual channels for 150 hours from the current time (EPG2, EPG3, EPG1-2 and EPG1-3). This EPG information is frequently transmitted to the EPG area 35A, and thus, the latest EPG can always be stored in the area 35A.

An electrically erasable programmable read only memory (EEPROM) 38 stores data that is preferably stored as required even after the power is turned off (for example, the history for the last four weeks received by the tuner 21, the channel number (last channel) received immediately before the power is off. Then, when the power is turned on, for example, the same channel as the last channel is received again.) If the last channel is not stored, the channel stored as a default in the ROM 37 is received. Also, even when the power is off, if the sleep mode is set, the CPU 29 renders a minimum set of circuits operable, such as the front end 20, the demultiplexor 24, the data buffer memory 35 and the like. The CPU 29 then measures the current time from the time information contained in the receiving signal and exercises control in such a manner that the circuits will be actuated at a predetermined time. For example, the CPU 29 performs automatic recording by use of the timer in cooperation with an external VCR. Further, when the predetermined on-screen display (OSD) data is desirably generated, the CPU 29 controls the MPEG video decoder 25. In response to such control, the video decoder 25 generates the predetermined OSD data and writes it into an OSD area 25aA (FIG. 28) of the DRAM 25a and further reads and outputs it, whereby predetermined characters, graphics, images, etc. (for example, the characters, station logos, category icons, still pictures of the program window, which are superimposed on the ordinary screen, as shown in FIGS. 3 through 10) can be output and displayed onto the monitor 4 as required. An SRAM 36 is used as working memory of the CPU 29. A modem 34 transmits and receives data via a telephone line under the CPU 29 control.

Figure 24:
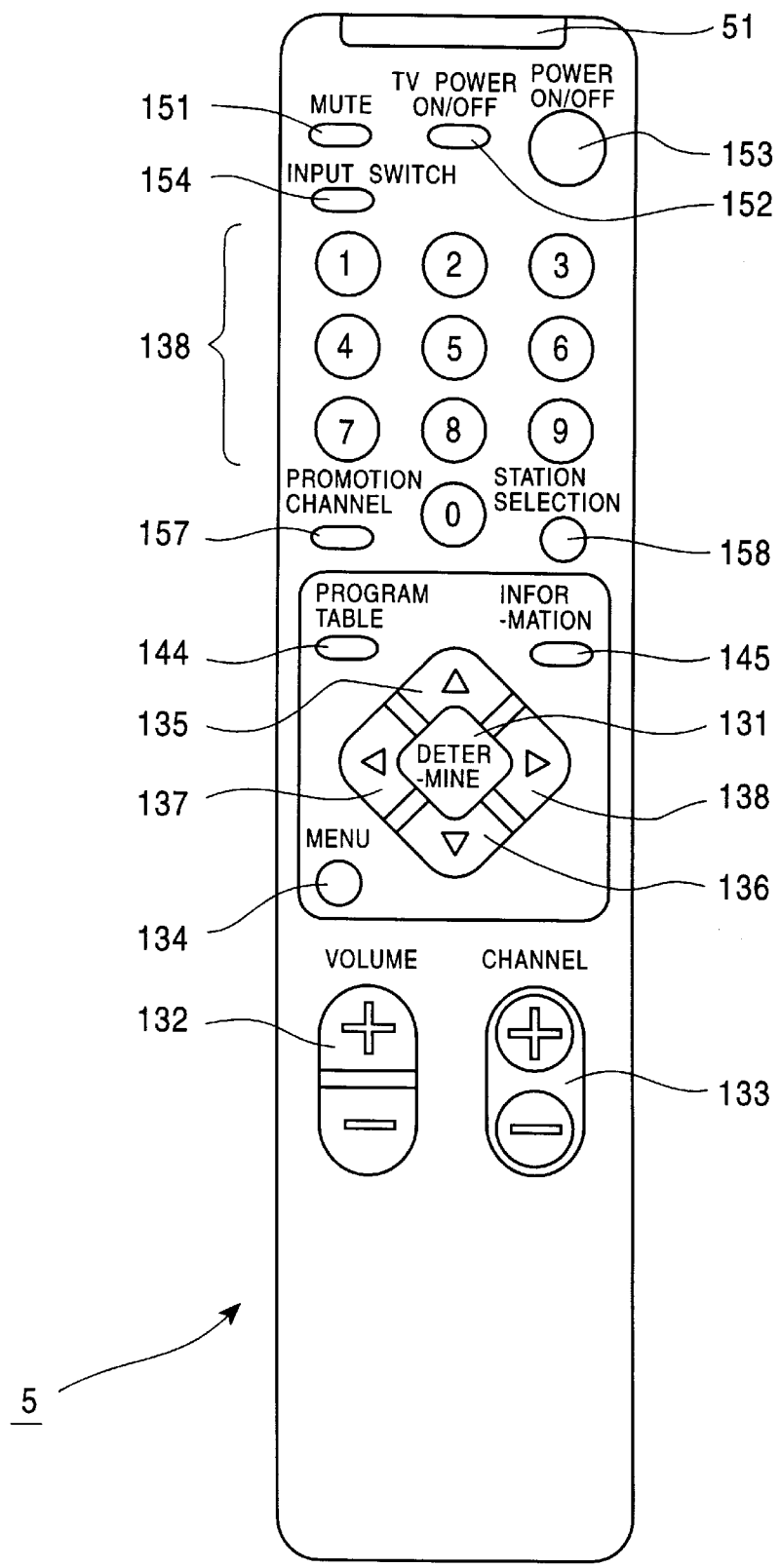
FIG. 24 is a plan view of an example of the arrangement of the remote commander shown in FIG. 20.

FIG. 24 is an example of the configuration of the button switches of the remote commander 5. A select button (determination key) switch 131 can be pressed (selected) perpendicularly relative to the top surface of the remote commander 5. A cursor-up button switch (upper key) 135, a cursor-down button switch (lower key) 136, a cursor-left button switch (left key) 137, and a cursor-right button switch (right key) 138 are used to shift the cursor in the upward, downward, left and right directions, respectively. A menu button switch 134 is pressed to display a menu screen on the monitor 4. A channel up-and-down button switch 133 is manipulated to increase or decrease the channel number to be received. A volume-button switch 132 is used to turn the volume up and down.

A ten-key numerical pad switch 138 indicating numbers 0 to 9 is used to input the numbers. A station-selection button switch 158 is pressed upon completion of the operation of the numerical pad button switch 138. The number input by the numerical pad switch 138 and determined by the station-selection button switch 158 represents the channel number. A promotion-channel button switch 157 is manipulated to select the promotion channel. A program-table button switch (guide-display operation means) 144 is pressed to display, for example, the data stream shown in FIG. 4. An information button switch (detailed-information display operation means) 145 is manipulated to display, for example, the information screen illustrated in FIG. 7. An input-changeover button switch 154 is pressed to change the input into the IRD 2. A mute button switch 151 is pressed to go into the mute mode in which sound is eliminated, and the mute mode is released when the button switch 151 is pressed again. A television on/off switch 152 and a power on/off button switch 153 are manipulated to turn on or off the power of the monitor (television receiver) 4 and the IRD 2, respectively.

Figure 25:
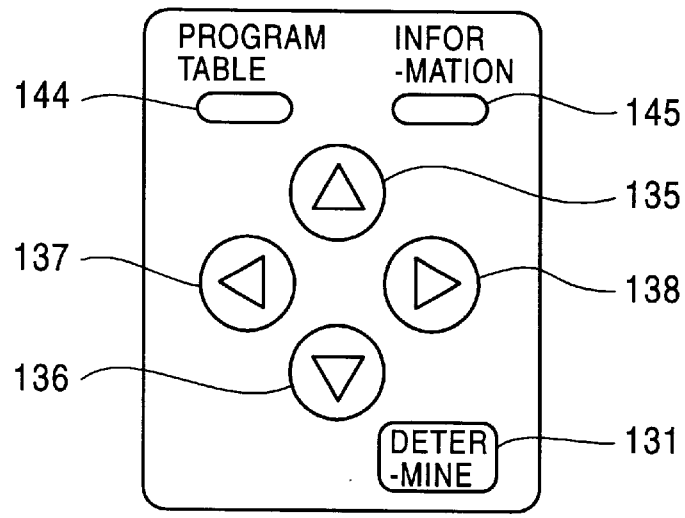
FIG. 25 illustrates another example of the arrangement of the button switches of the remote commander.

FIG. 25 is another example of the arrangement of the button switches. In this embodiment, the select button switch 131 is disposed on the lower right of the cursor-up button switch 135 through the cursor-right button switch 138.

Figure 26:
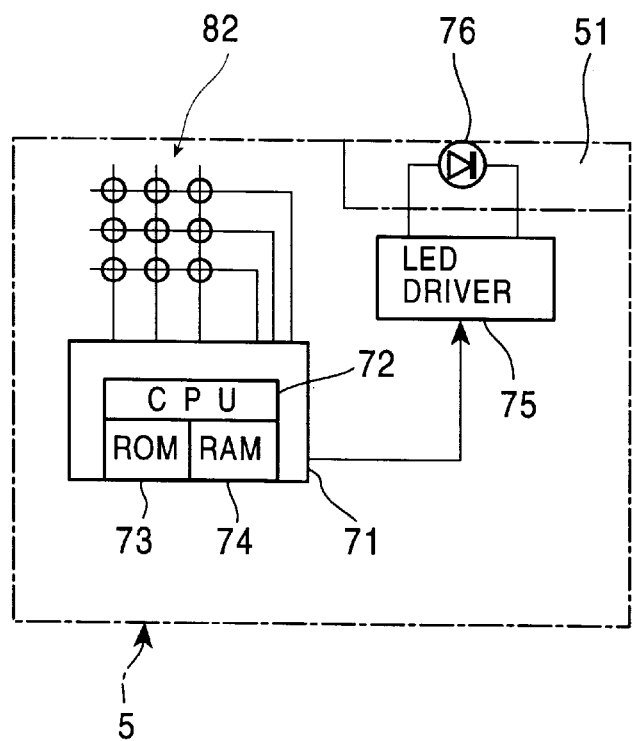
FIG. 26 is a block diagram of an example of the internal configuration of the remote commander shown in FIG. 24.

FIG. 26 is an example of the internal configuration of the remote commander 5. A CPU 72 for use in a microcomputer 71 always scans a button switch matrix 82 and detects the operations of the various types of button switches located on the remote commander 5 shown in FIG. 24. The CPU 72 executes various types of processing based on the program stored in a ROM 73 and stores required data in a RAM 74. The CPU 72 drives an LED 76 through an LED driver 75 to output an IR signal.

Figure 27:
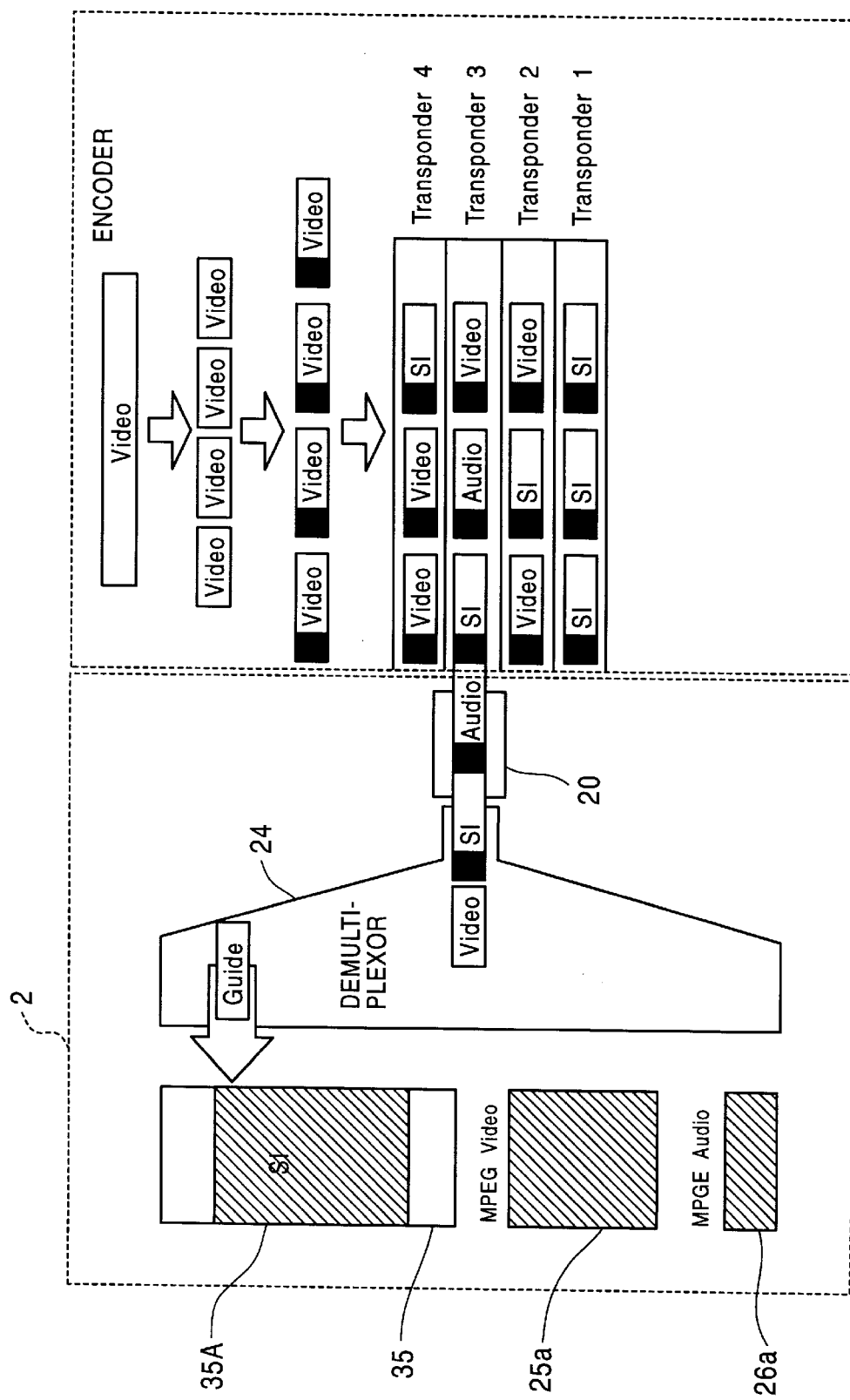
FIG. 27 schematically illustrates the processing executed in the encoder of the transmitting end and in the IRD of the receiving end.

FIG. 27 schematically illustrates the state in which video data, audio data and SI data (including EPG data) are formed into a packet and transmitted, and then demodulated in the IRD 2. In the transmitting encoder, as shown in FIG. 27, the SI data, video data and audio data are formed into a packet which is then transmitted to a BSS-band high-output transponder at a frequency from 12.25 GHz to 12.75 GHz loaded with a satellite. More specifically, packets of a plurality of (at a maximum of 10) channels are multiplexed to be transmitted onto a signal at a predetermined frequency allocated to each transponder. Namely, each transponder transmits a plurality of broadcast channels by use of a carrier wave (transmission channel). Accordingly, if there are 23 transponders, for example, data concerning a maximum number of 230 (=10×23) broadcast channels can be transmitted.

In the IRD 2, the front end 20 receives a carrier wave at a frequency corresponding to a predetermined transponder and demodulates it. Consequently, the packet data representing a maximum number of 10 (5 channels in this embodiment) broadcast channels can be obtained. The demultiplexor 24 then temporarily stores the respective packets obtained from the demodulated output of the front end 20 in the data buffer memory 35 and reads them therefrom. The data portions other than the header of each SI packet including the EPG data are stored in the EPG area 35A. The video packet is stored in the DRAM 25a and then decoded in the MPEG video decoder 25. The audio packet is, on the other hand, stored in the DRAM 26a and decoded in the MPEG audio decoder 26.

Scheduling is arranged so that the transmission rates of the respective transponders can be the same. The transmission rate per carrier wave allocated to each transponder is 30 Mbits/second. For example, MPEG video data having images with rapid motion, such as a sport program, possesses a large number of packets. Accordingly, the number of the programs with rapid motion that can be transmitted via a transponder is inevitably smaller. In contrast, MPEG video data having images with less motion, such as announcement in a news program, can be transmitted in a fewer number of the packets. Accordingly, the number of the programs with less motion that can be transmitted via a transponder is larger.

Figure 28:
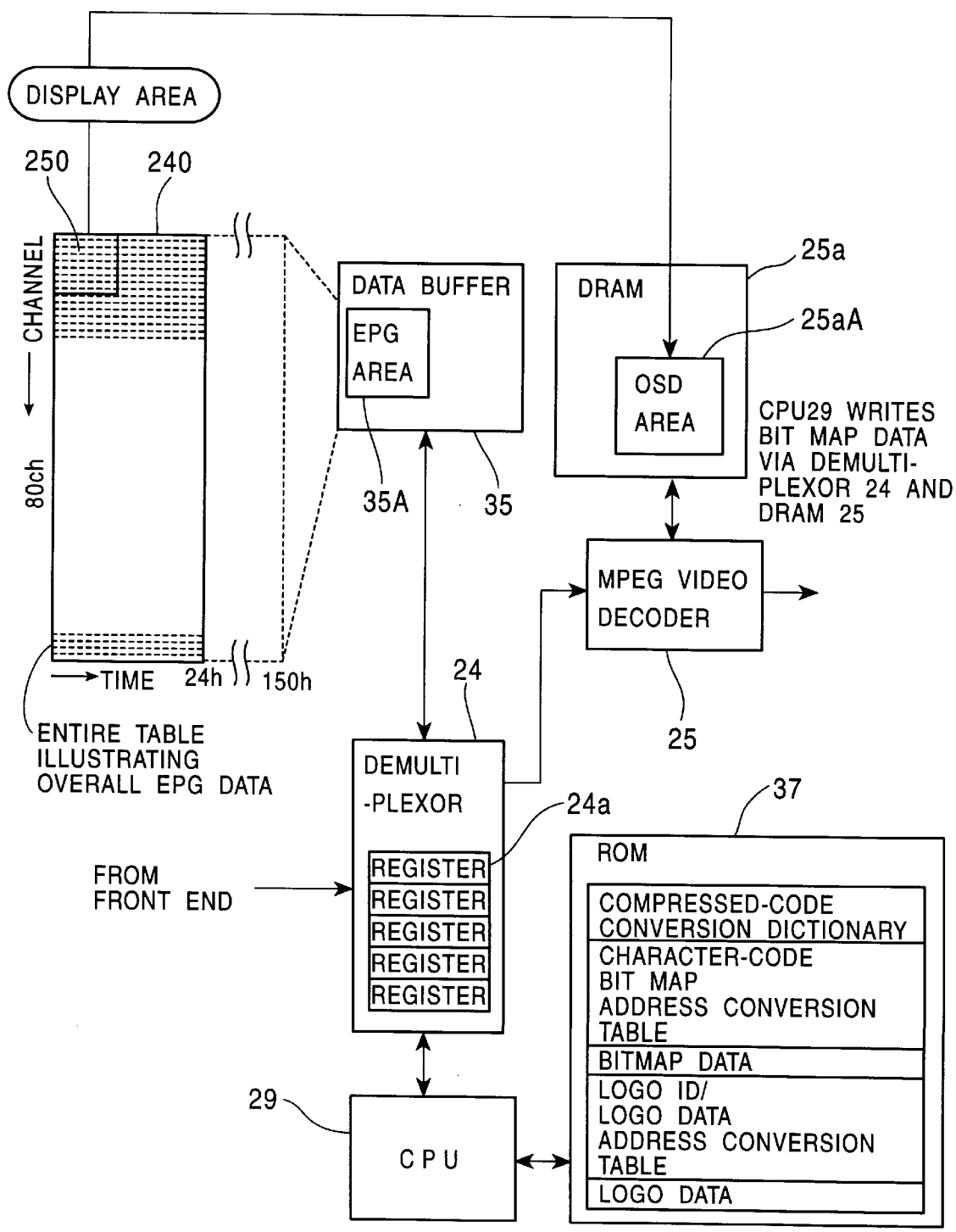
FIG. 28 illustrates the EPG data stored in the EPG area shown in FIG. 23.

FIG. 28 schematically illustrates the data processing of displaying a frame of a program table on the monitor 4. The CPU 29 has set the transfer destinations of the data input from the front end 20 in registers 24*a* built into the demultiplexor 24. The data supplied from the front end 20 is temporarily stored in the data buffer memory 35, and is then read to the demultiplexor 24 and transferred to the destinations set in the registers 24*a*. Referring to the header added to each packet, the demultiplexor 24 transfers the MPEG video data and the MPEG audio data to the MPEG video decoder 25 and the MPEG audio decoder 26, respectively. If the packet ID (PID) included in the header is SDT or EIT, the EPG data (SI data) is stored in a predetermined address of the EPG area 35A set in the register 24*a*. The header is no longer required upon completion of this data transfer and is thus discarded.

In this manner, when radio waves are received from a normal transponder (any transponder other than the promotion-channel guide transponder), the reduced-size still-picture data and the brief program explanation data (program table) for 80 (37) broadcast channels for 24 hours from the current time, and the detailed program explanation data (program content) concerning the current program and the subsequent program for 80 channels, are captured into the EPG area 35A. The EPG data can be received from any normal transponder. Namely, the same EPG data is transmitted from any normal transponder. In contrast, when radio waves are received from the guide transponder (when the promotion channel is received), the reduced-size still-picture data and the brief program explanation data for 80 (37) channels for 150 hours from the current time, and the detailed program explanation data for 70 hours from the current time are captured into the EPG area 35A.

The CPU 29 reads for a predetermined duration (the current time in the example illustrated in FIG. 4, and for approximately 4 hours from the current time in the example illustrated in FIG. 8) the program data on the broadcast channels (for example, 5 broadcast channels in the example shown in FIG. 4, and 15 channels in the example shown in FIG. 8) in a predetermined display zone 250 of an entire EPG table 240 from the EPG area 35A and writes it into the OSD area 25*a*A of the DRAM 25*a* as bit map data. Then, the MPEG video decoder 25 reads the bit map data from the OSD area 25*a*A and outputs it to the monitor 4, whereby the EPG data, such as the reduced-size still pictures (FIG. 4) and the entire program table (FIG. 8), can be displayed.

The MPEG video decoder 25 can decode the image data compressed according to the JPEG method, as well as the image data compressed according to the MPEG method. However, the decoder 25 can decode the image data only in its original size. For overcoming this drawback, the CPU 29 incorporates the decoded still-picture data and converts it to the reduced-size frame whose data is once again output to the MPEG video decoder 25. The data can thus be displayed as the reduced-size frame by use of the OSD function of the decoder 25.

When characters are displayed as OSD data, it is necessary to expand the compressed character data stored in the EPG area 35A by the use of a dictionary. For performing this expanding operation, a compressed-code conversion dictionary is stored in the ROM 37. Also stored in the RON 37 is a mapping table (address conversion table) representing the relationship between the character codes and the stored positions of the fonts in the bit map data. By referring to this mapping table, the bit map data corresponding to a predetermined character code can be read and written into the OSD area 25*a*A. The bit map data itself is also stored in a predetermined address of the ROM 37.

Further, when logo data is not transmitted, not only the logo data (data on the various types of logos including category logo and station logo) for displaying logos is stored in the ROM 37, but also the logo ID and the address conversion table for reading the logo data (bit map data) corresponding to the ID are stored as well. When the logo ID is identified, the logo data stored in the address corresponding to its ID is read and written into the OSD area 25*a*A, whereby the logo representing the category of the program can be displayed on the monitor 4. In other words, when the logo data is transmitted, it is superimposed by the superimposers 333-1 through 333-4. If the logo data transmitted from the transmitting end is interrupted deliberately, the ID is transmitted, and the bit map data corresponding to its ID is read from the ROM 37.

In this fashion, when the program-table button switch 144 of the remote commander 5 is manipulated while a normal program is received and displayed on the monitor 4, a data stream formed of five reduced-size frames is displayed on the screen of the monitor 4, as shown in FIG. 4. The cursor is also displayed on a predetermined reduced-size frame of the data stream. The cursor-left button switch 137 and the cursor-right button switch 138 are pressed to shift the cursor in the left and right directions, respectively. For simpler representation of the entire frame, the category icon displayed on the reduced-size frame specified by the cursor disappears. At the same time, the category icon, station logo and title of the program defined by the cursor are displayed in the title bar. When the user further presses the select button 131, the CPU 29 controls the tuner 21 so that the program defined by the cursor can be received. This makes it possible to display the selected program with its original size on the monitor 4.

On the other hand, when the information button switch 145 of the remote commander 5 is pressed while the data stream is displayed, as illustrated in FIG. 4, more detailed information (information frame) concerning the program selected by the cursor can be displayed, as shown in FIG. 7. More specifically, the still picture can be displayed in a greater size than the picture shown in FIG. 4, while the category icon, station logo and title are displayed in the title bar. The broadcast date and time, casts-and synopsis are also displayed. Then, the user can grasp the idea of the program by referring to the display. When the user presses the select button switch 131 while the information frame such as shown in FIG. 7 is displayed, the program is received and displayed.

Figure 29:
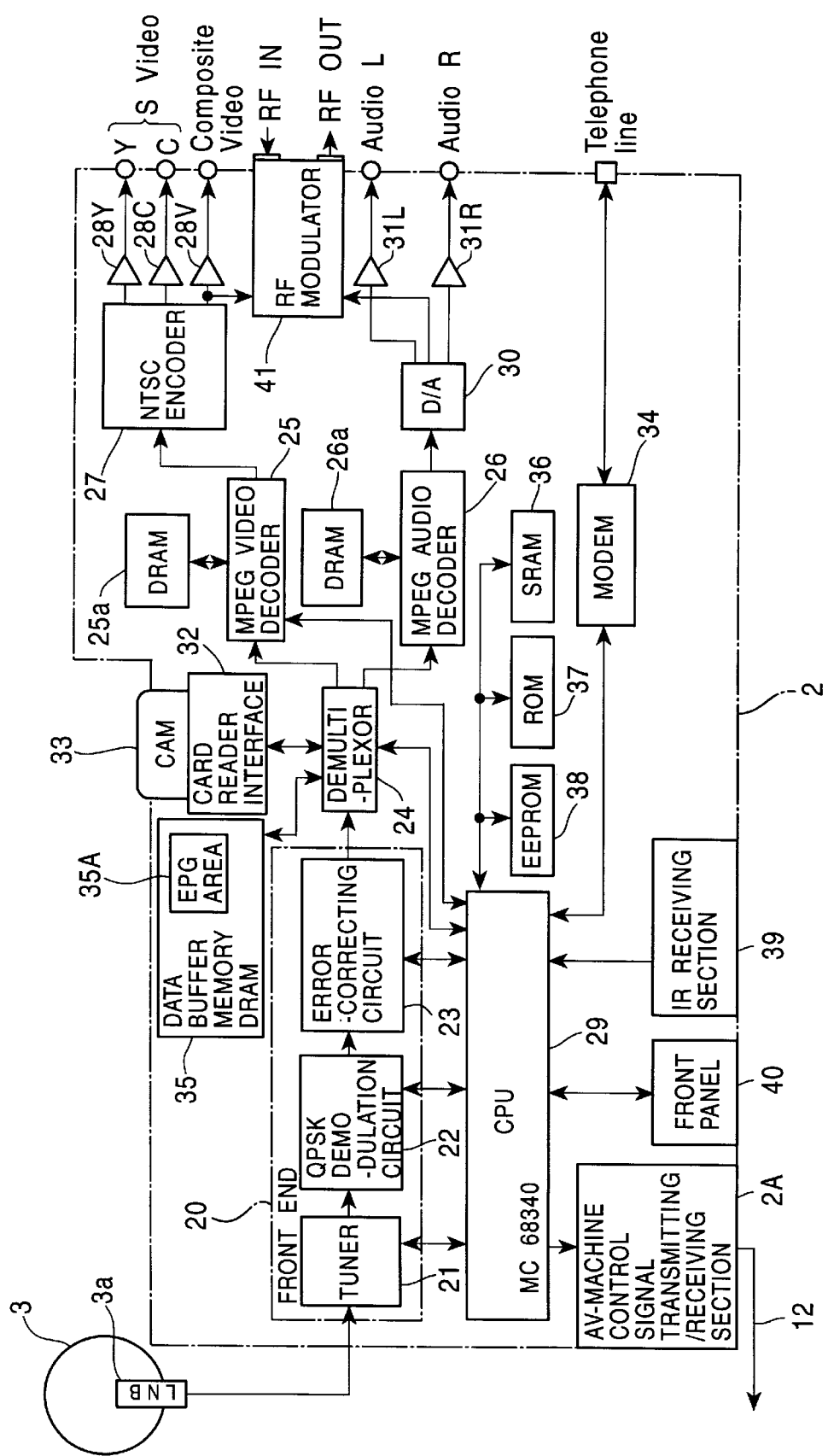
FIG. 29 is a block diagram of another example of the configuration of the IRD.

The above-described operation is performed when the IRD 2 has a function of processing still pictures. An explanation will now be given when the IRD 2 is constructed as shown in FIG. 29, and more specifically, the IRD 2 does not possess a function of processing still pictures but has a function of primarily processing characters only. When the program-table button switch 144 of the remote commander 5 is pressed, the entire program table shown in FIG. 8 is displayed in characters on the monitor 4. The cursor-up button switch 135 through the cursor-right button switch 138 are manipulated to shift the cursor onto a predetermined broadcast channel of the entire program table displayed as shown in FIG. 8, and the select button switch 131 is further pressed to display the program table of the broadcast channel on the monitor 4, as illustrated in FIG. 9. When the cursor is shifted to the predetermined program and the select button switch 131 is manipulated, the CPU 29 controls the tuner 21 to allow the program to be received.

Figure 30:
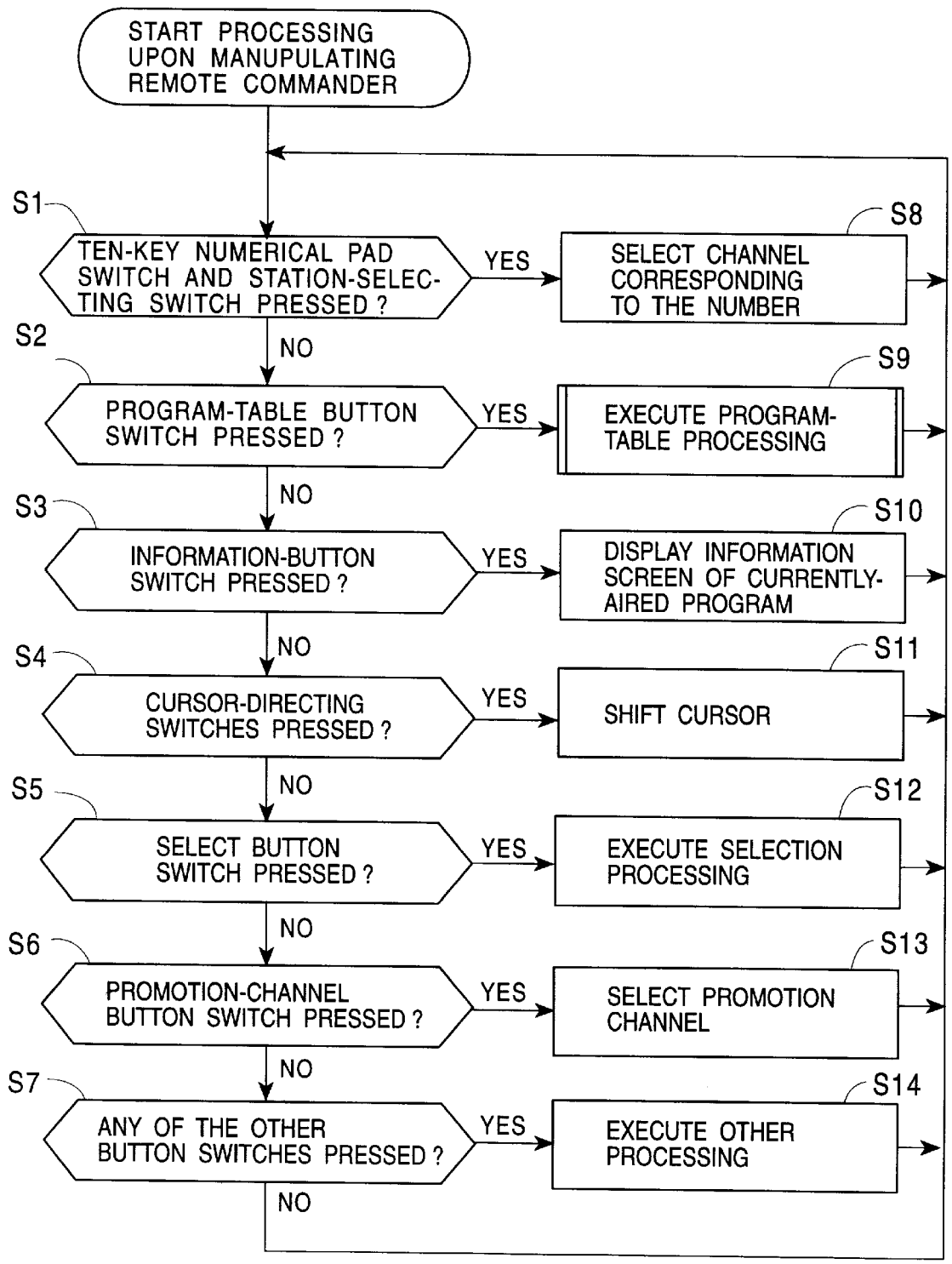
FIG. 30 is a flow chart of an example of the processing executed by the remote commander.

FIG. 30 illustrates an example of the operation when the various button switches of the remote commander 5 are manipulated. It is first determined in S1 as to whether the ten-key numerical pad switch 138 and the station-selecting button switch 158 have been pressed. If the answer is no, a query is further made in S2 as to whether the program-table button switch 144 has been manipulated. If the answer is no, a question is further asked in S3 whether the information button switch 145 has been pressed. Moreover, determinations are further made, in S4 as to whether any of the cursor-up button switch 135 through the cursor-right button switch 138 has been manipulated, in S5 as to whether the select button switch 131 has been pressed, in S6 as to whether the promotion-channel button switch 157 has been operated, and in S7 as to whether one of the other button switches has been actuated.

If it is determined in S1 that the numerical pad switch 138 and the program-table button switch 144 have been actuated, the flow proceeds to S8 in which the channel associated with the input number is selected. Namely, the CPU 29 causes the tuner 21 to receive the channel. If it is judged in S2 that the program-table button switch 144 has been manipulated, the flow proceeds to S9 in which the program-table processing is executed, which will be described in greater detail below with reference to FIG. 31.

If it is determined in S3 that the information button switch 145 has been pressed, the flow proceeds to S10 in which the information screen of the currently-aired program is displayed. More specifically, the CPU 29 causes the MPEG video decoder 25 to generate OSD data of the information screen of the currently-aired program by use of the OSD function of the decoder 25 and to display it onto the monitor 4. If the information button switch 145 is pressed while an information frame is already displayed, the frame disappears.

If it is judged in S4 that any of the cursor-up button switch 135 through the cursor-right button switch 138 has been manipulated, the flow proceeds to S11 in which the cursor is shifted in the designated direction. Further, if it is determined in S5 that the select button switch 131 has been actuated, the flow proceeds to S12 in which a selection is made in correspondence with the position of the cursor. If it is judged in S6 that the promotion-channel button switch 157 has been operated, the flow proceeds to S13 in which the promotion channel is selected. That is, the CPU 29 causes the tuner 21 to receive the promotion channel. Additionally, if it is determined in S7 that one of the other button switches has been pressed, the flow proceeds to S14 in which the operation corresponding to the operated button switch is performed.

Figure 31:
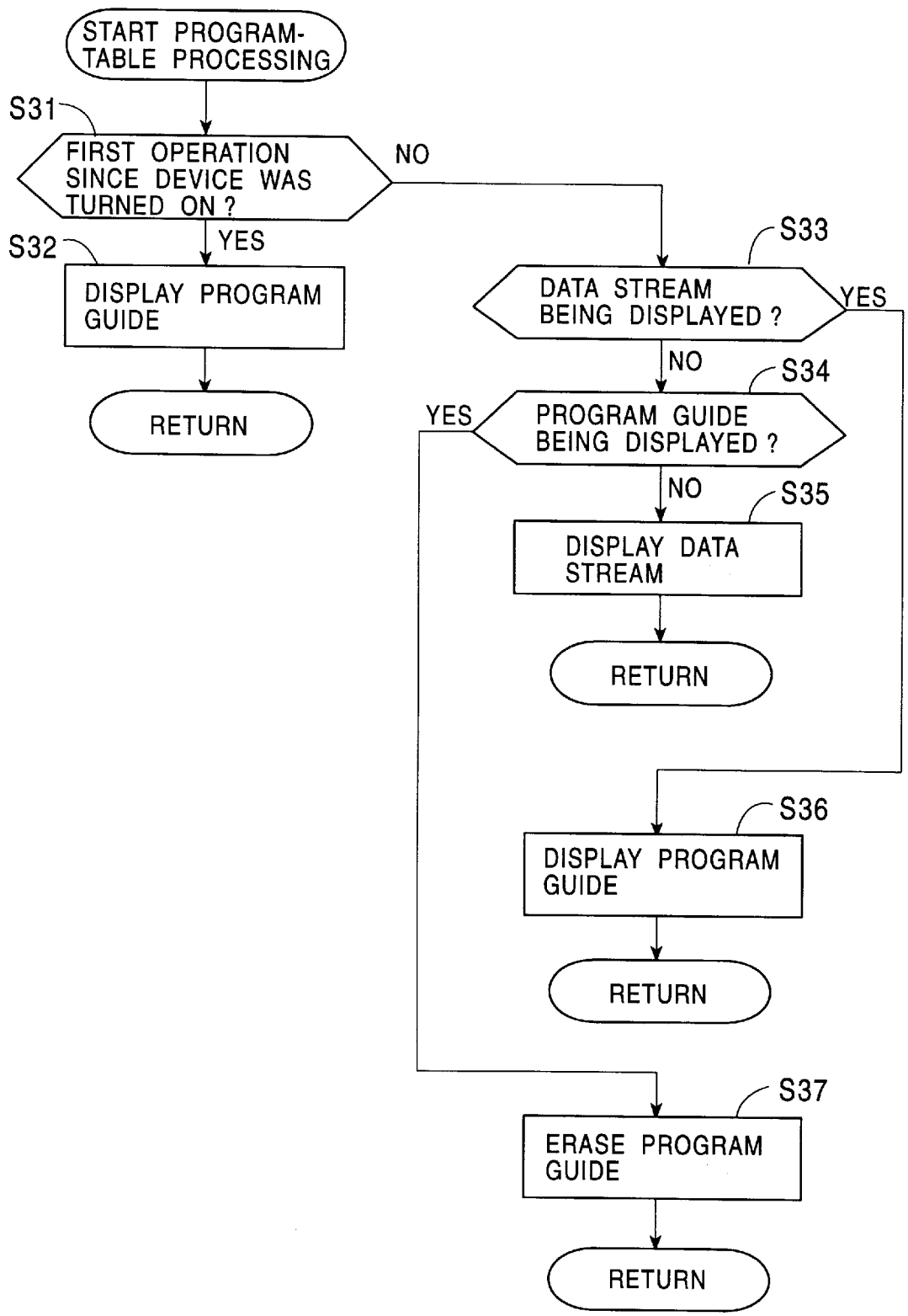
FIG. 31 is a flow chart of the detailed program-table processing executed in S9 of FIG. 30.
Figure 32:
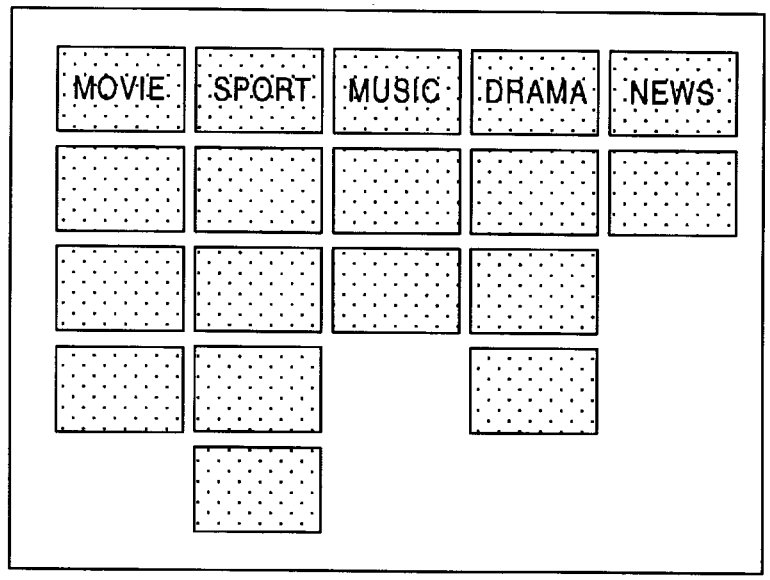
FIG. 32 illustrates an example of the processing of displaying a program guide executed in S32 of FIG. 31.

The program-table processing will now be explained in greater detail with reference to FIG. 31. It is first determined in S31 as to whether it was the first time to operate the program-table button switch 144 since the IRD 2 was turned on. If the answer is yes, the flow proceeds to S32 in which a program guide of the still pictures is displayed. In this guide, for example, as shown in FIG. 32, the program categories, such as movies, sport, music, drama, news, etc., are arranged in the horizontal direction, while the still pictures of each category are sequentially displayed in the vertical direction. Namely, in the leftmost column of FIG. 32, for example, the still pictures of all the movies to be broadcast on a predetermined channel are displayed, and in the second column from the left, the still pictures of all the sport programs to be broadcast on the respective channels are displayed.

Figure 33:
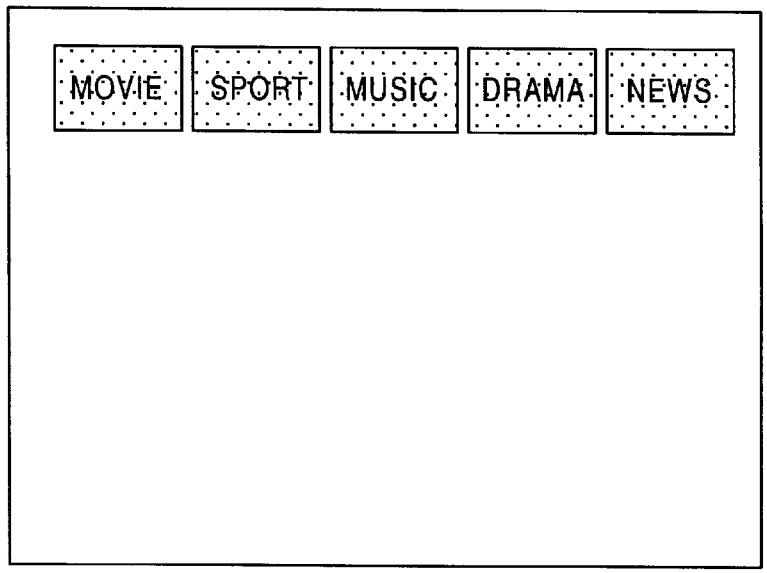
FIG. 33 illustrates an example of the processing of displaying a data stream executed in S35 of FIG. 31.

In contrast, if it is determined in S31 that it was not the first time to operate the program-table button switch 144 since the IRD 2 was turned on, the flow proceeds to S33 in which it is judged whether a data stream is currently displayed, as shown in FIG. 33 (or FIG. 4). In other words, it is determined in S33 whether the program-table button switch 144 has been pressed while a data stream is displayed. If the answer in S33 is no, the flow proceeds to S34 in which it is judged as to whether a program guide, such as shown in FIG. 32, is displayed. If the answer is no, the flow proceeds to S35 in which a data stream, such as illustrated in FIG. 33, is displayed.

On the other hand, if it is determined in S33 that a data stream is displayed, the flow proceeds to S36 in which a program guide, such as illustrated in FIG. 32, is displayed. If it is judged in S34 that a guide is displayed, the flow proceeds to S37 in which processing is executed to cause the guide to disappear.

The above-described processing can be summarized as follows. If the program-table button switch 144 is manipulated immediately after the IRD 2 is turned on, the categorized reduced-size still pictures of the typical frames of the programs to be broadcast on the respective channels, such as shown in FIG. 32, are displayed. In this state, if the program-table button switch 144 is actuated once again, the guide disappears. If the switch 144 is pressed once again afterwards, a data stream having the still pictures, one for each category, is displayed in a band-like form in the horizontal direction, as illustrated in FIG. 33. One more pressing of the switch 144 causes the data stream to disappear and the above-described guide, such as shown in FIG. 32, to reappear. Another press of the switch 144 again causes the guide to disappear.

It is often the case that a desired program be selected immediately after the IRD 2 is turned on. Accordingly, the program-table button switch 144 is manipulated to display a program guide of the individual categories, as shown in FIG. 32. On the other hand, if the switch 144 is further pressed afterwards, it is often the case that a desired program other than the currently-aired program will be selected. Accordingly, in order to avoid the image of the currently-aired program from being hidden behind the guide shown in FIG. 32, a data stream having still pictures, one for each category, is displayed, as illustrated in FIG. 33. It is thus possible to select another program while observing the currently-aired program. Upon comparison between FIGS. 32 and 33, only the still pictures displayed on the uppermost of the screen illustrated in FIG. 32 are displayed, as is shown in FIG. 33.

Figure 34:
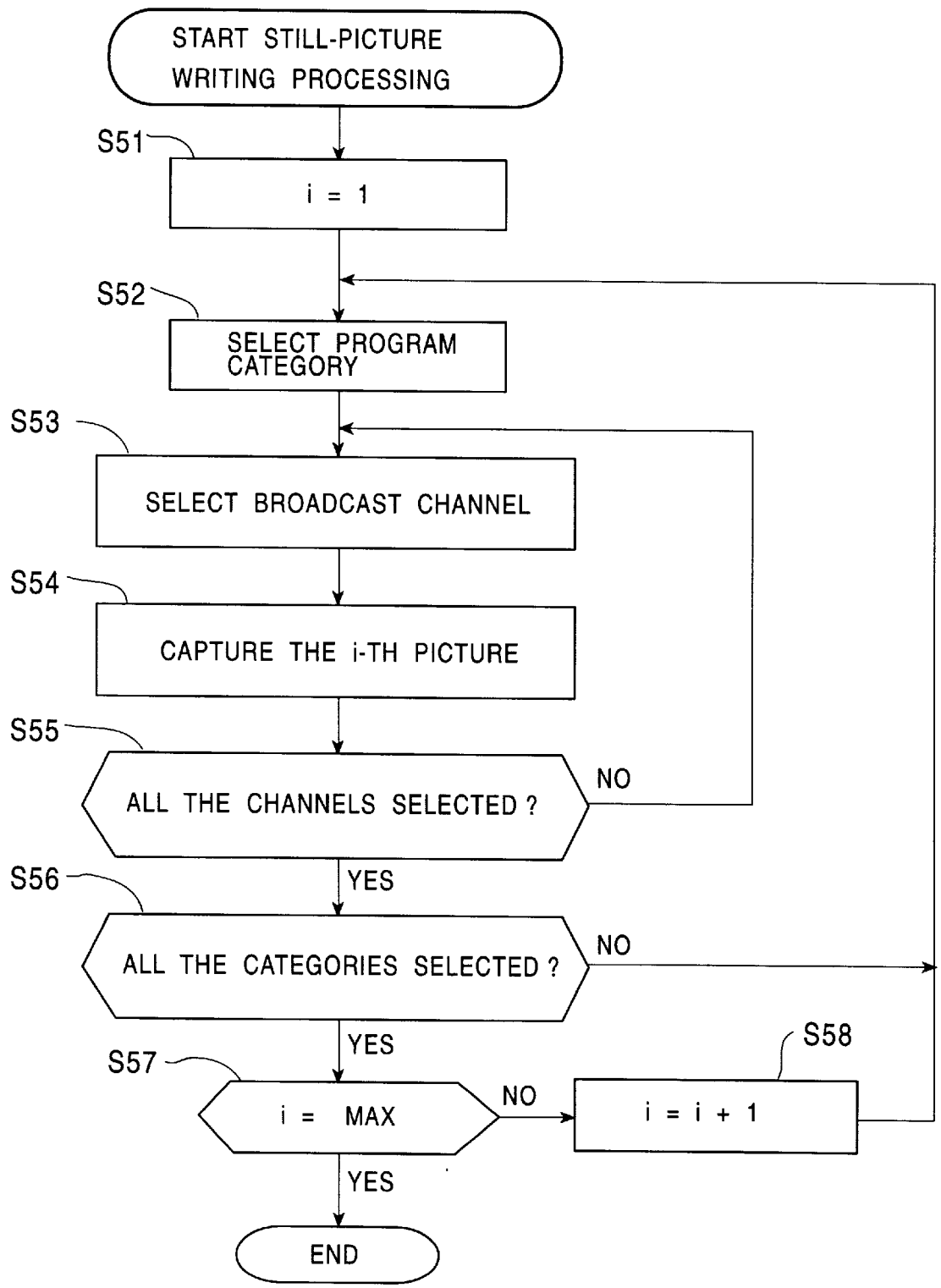
FIG. 34 is a flow chart of a still-picture writing operation.

For enabling the above-described program guide or the data stream to be displayed, the CPU 29 executes processing, as indicated by the flow chart of FIG. 34, to write the still pictures of the individual broadcast channels into the EPG area 35A of the data buffer memory 35. More specifically, the variable i is first initialized to be 1 in S51, and a desired program category, for example, a movie category, is selected in S52. Then, in S53, a desired channel, for example, a first channel, is selected. The flow proceeds to S54 in which the i-th (in this case, the first) still picture is captured. Namely, if the program which is currently aired on the first channel is a movie, a still picture of the movie is captured and written into the EPG area 35A.

Subsequently, the flow proceeds to S55 in which it is judged as to whether a similar selection has been made for all the broadcast channels. If the answer is no, the flow returns to S53 in which a subsequent channel, i.e., a second channel, is selected. Then, in S54, if the currently-aired program is a movie on the second channel, it is captured as the second still picture of the movie category. If the program is not a movie, the picture is not captured since its category is different.

Similarly, the above-described processing is repeated for all the channels. For example, when there are 80 broadcast channels, the first through eightieth channels are searched, and the movie programs are sequentially captured.

When it is determined in S55 that all the channels have been searched, the flow proceeds to S56 in which it is further judged whether all the categories have been searched. In this case, only the movie category has been searched, the flow returns to S52 in which a subsequent category, for example, music, is selected. In S53, the first channel is again selected, and in S54, if the program which is currently aired on the first channel is a music program, it is captured, and if not, it is not captured. Then, if the answer in S55 is no, the flow returns to S53 in which the second channel is selected, and if the currently-aired program is a music program, it is captured.

The above-described processing is repeated, and if it is judged in S55 that the search for music programs has been completed for all of the first through the eightieth channels, it is further determined in S56 as to whether all the categories have been selected. If the answer is no, the flow returns to S52 in which, another category, for example, sport, is selected. Thereafter, a search similar to the above-described processing is made for the sport programs.

In this manner, if it is judged in S56 that the search for the programs which are currently aired has been completed to all of the pre-divided categories, such as movies, music, sports, drama, variety & specials, documentary, culture & hobbies, animation & family, news, weather, program guides, information, shopping, games, Karaoke, adult, and others, the flow proceeds to S57. It is further judged as to whether the variable i is the maximum value (i.e., whether search has been completely made for all the future programs to be transmitted as EPG). If there are still pictures of the future programs, the flow proceeds to S58 in which the variable i is incremented by one, and processing in and after S52 is repeated. Namely, a search similar to the above-described processing is made for a future program to be broadcast subsequent to the currently-aired program. Similar processing is further repeated until it is determined in S57 that the search has been completed for all future programs to be transmitted as EPG.

Figure 35:
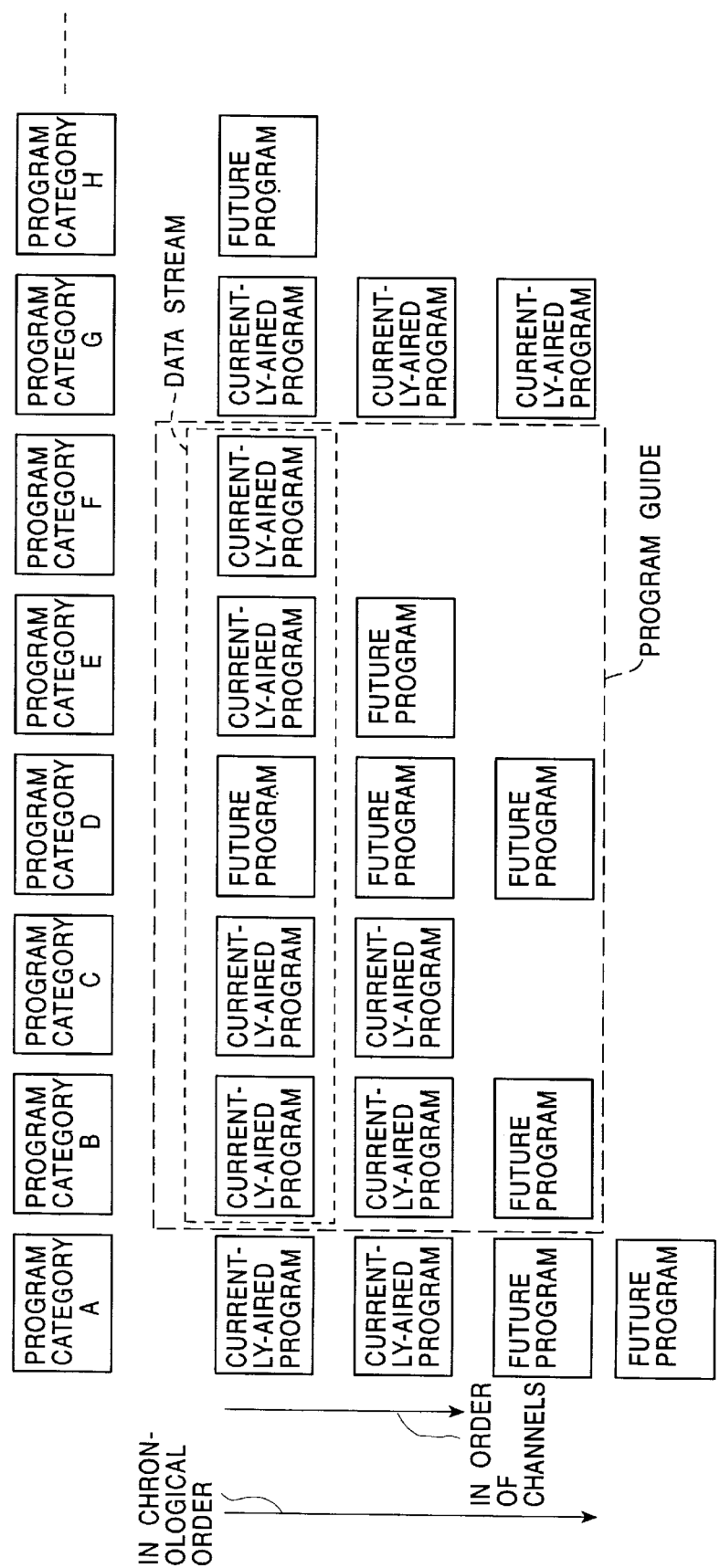
FIG. 35 illustrates a program guide obtained by the processing shown in FIG. 34.

In this fashion, still pictures used as EPG are categorized and arranged in chronological and channel orders. Further, subsequent to the programs which are broadcast currently and in the near future, the programs to be broadcast in the more distant future are sequentially disposed in chronological and channel orders. As a result, the programs are stored, as shown in FIG. 35, among which the programs within a predetermined zone are written into the OSD area 25aA and read therefrom to be displayed as a data stream or a program guide. Thus, a desired still picture can be selected from the pictures displayed in the form of a data stream or a guide by shifting a cursor. This selecting operation will now be explained with reference to FIG. 36.

Figure 36:
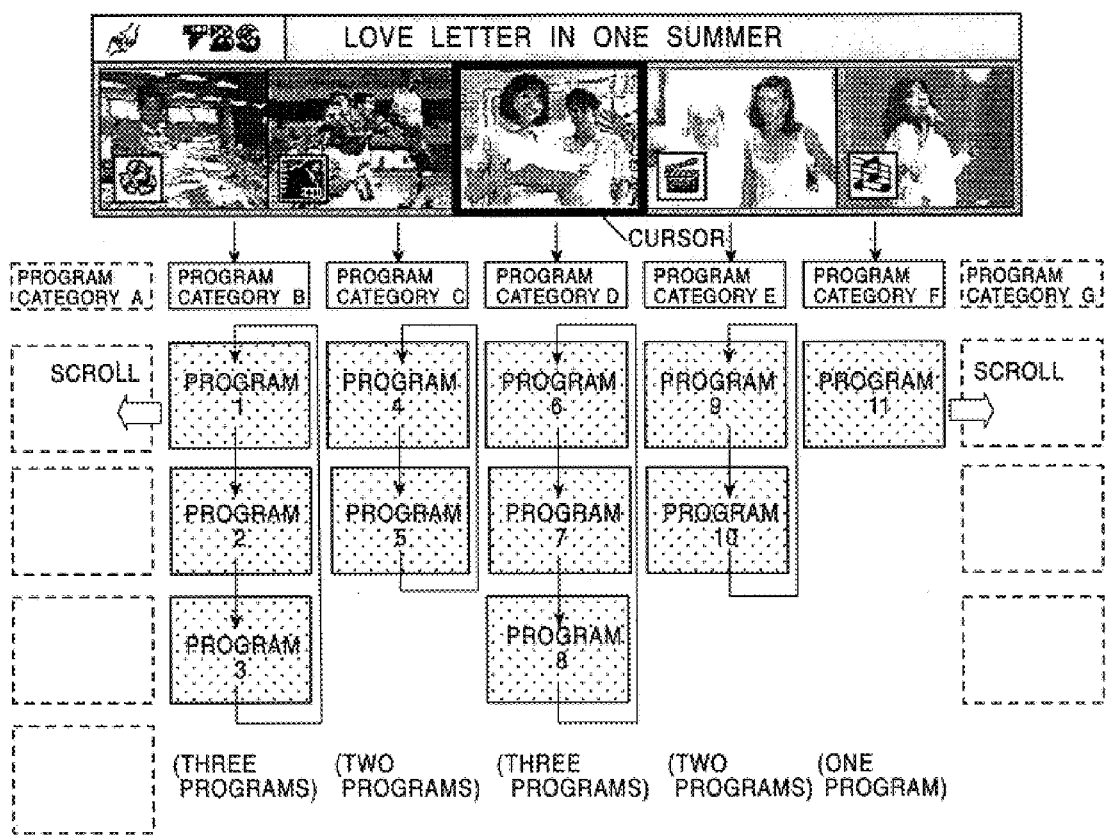
FIG. 36 illustrates the operation of selecting a desired program from still pictures.

In the embodiment illustrated in FIG. 36, three programs, such as the programs 1 through 3, as the category B, two programs, such as the programs 4 and 5, as the category C, three programs, such as the programs 6 through 8, as the category D, two programs, such as the programs 9 and 10, as the category E, one program, such as the program 11, as the category F, are captured. When the still pictures of the programs in the categories B through F are to be displayed as a data stream, the programs 1, 4, 6, 9 and 11 are displayed.

In this state, the CPU (still-picture display means) 29 causes the MPEG video decoder 25 to display the cursor on any of the still pictures by use of the OSD function of the decoder 25. The user manipulates the cursor-left button switch 137 or the cursor-right button switch 138 (designating means) to shift the cursor in the left or right direction, thereby selecting a desired category. Every time either of the button switch 137 or 138 is pressed, the cursor will be shifted to a still picture next to the picture currently designated by the cursor in the left or the right direction.

If the cursor positioned in the leftmost or the rightmost picture is shifted in the left or the right direction, the picture is scrolled in the right or the left direction. More specifically, for example, when an instruction is given to shift the cursor positioned on the program 1 of the category B in the left direction by manipulating the left button switch 137, the picture of the program 1 of the category B is shifted to the next position in the right direction. Simultaneously, the picture of the program 4 of the category C is also shifted to the next position in the right direction. Similarly, each picture is shifted to the next position in the right direction, and the program 9 of the category E is displayed in the rightmost position of the screen. At the same time, the program 11 of the category F which has been displayed in the rightmost position disappears, and the picture of the category A is newly displayed in the position where the picture of the program 1 of the category B has been located.

Likewise, when the right button switch 136 is pressed while the cursor is positioned on the picture of the program 11 of the category F in the rightmost position of the screen, the picture of the program 11 is shifted to the next position in the left direction, and thereafter, the individual pictures of the categories, E, D and C are sequentially shifted in the left direction. Then, the picture of the program 1 of the category B in the leftmost position of the screen disappears, and the picture of the category G is newly displayed in the rightmost position.

If the cursor-up button switch 135 or the cursor-down button switch 136 is further manipulated after the cursor is positioned on the picture of a desired program, the picture having the cursor thereon is scrolled in the downward or the upward direction. For example, when the cursor-up button switch 135 is actuated while the cursor is placed on the picture of the program 6 of the category D, the picture of the program 6 disappears and the picture of the program 8 is newly displayed. When the switch 135 is further manipulated, the picture of the program 8 is substituted with the picture of the program 7. Similarly, one more press of the switch 135 substitutes the picture of the program 7 with the picture of the program 6.

Conversely, if the cursor-down button switch 136 is pressed while the cursor is placed on the picture of the program 6, the still picture of the program 6 is substituted with the picture of the program 7. One more press of the switch 136 substitutes the program 7 with the program 8, and a further press of the switch 136 substitutes the program 8 with the program 6.

In this manner, a desired program can be selected by shifting the cursor onto the picture of the program and then manipulating the select button switch (selection means) 131. Such processing is executed in S4 and S11 and S5 and S12 shown in FIG. 30.

As illustrated in FIG. 36 (FIG. 4), a category icon representing the category of the program is displayed on each still picture of the data stream. The user can identify the category from the icon. For easier representation of the entire frame, the category icon displayed on the picture specified by the cursor disappears. At the same time, the category icon, station logo and title of the program defined by the cursor are displayed in the title bar. Then, the user can identify the category, the station and the title of the program by referring to this title bar.

FIG. 37 illustrates display examples of the icons of the categories, such as movies, music, sports, drama, variety & specials, documentary, culture & hobbies, animation & family, news, weather, program guides, information, shopping, games, Karaoke, adult, and others. FIG. 38 illustrates display examples of the station logos, such as NHK 1, NHK3, NTV, TBS, FUJI, TV ASAHI, TV TOKYO, and WOWOW. These icons are used for the convenience of illustration only and are not intended to be used for actual broadcast programs.

Figure 39:
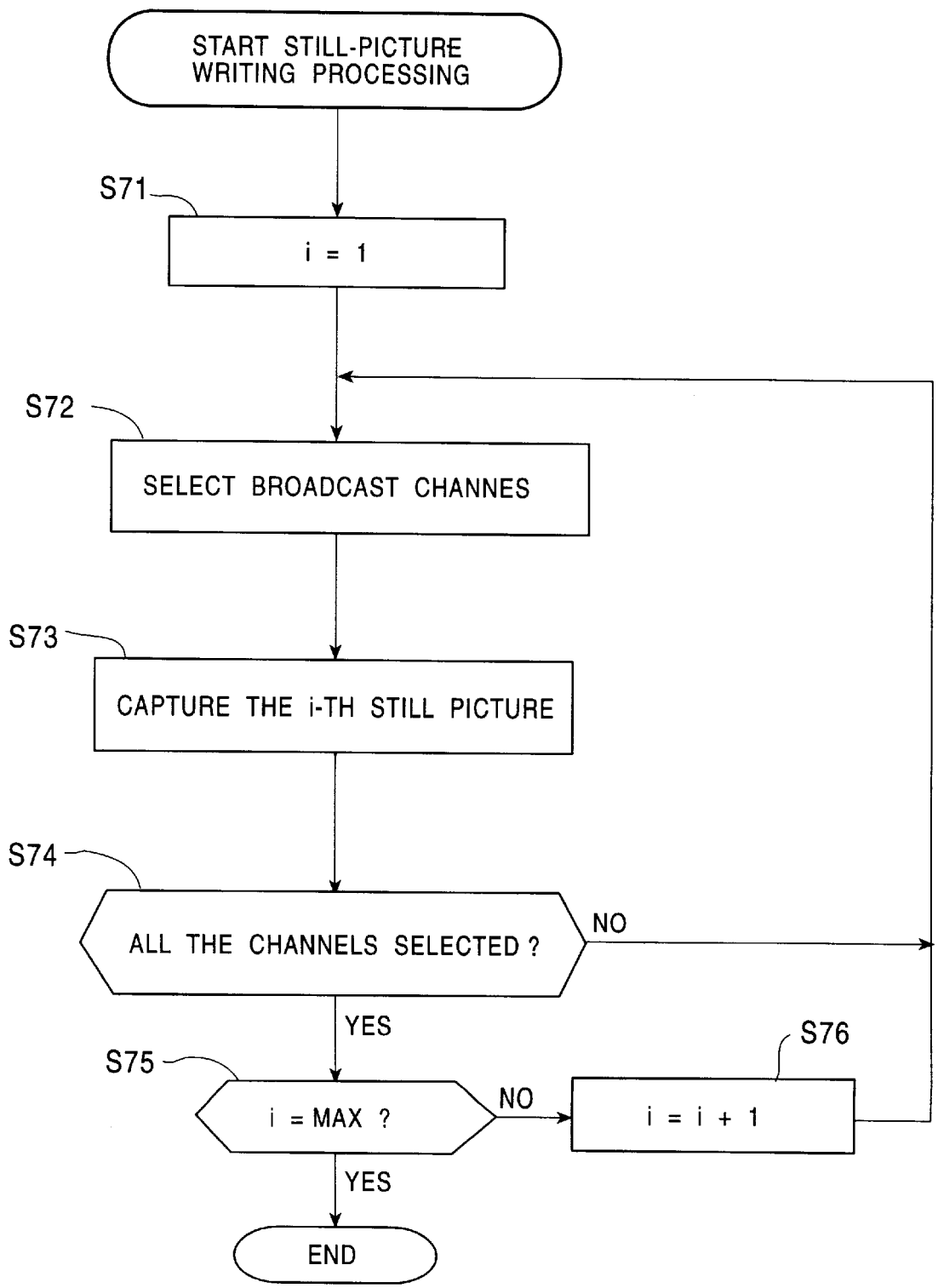
FIG. 39 is a flow chart of another example of the processing of writing still pictures.

Although in this embodiment the still pictures are divided by program category, they may be categorized by channel. In this case, the CPU 29 executes processing to write still picture data into the EPG area 35A according to the flow chart of FIG. 39.

In S71, the variable i is first initialized to 1, and a broadcast channel to be first processed (first channel) is selected in S72. Subsequently, in S73, the i-th (in this case, the first) still picture is captured, i.e., the picture of the program currently aired on the first channel is captured. It is then determined in S74 as to whether a search has been completed with respect to all of the broadcast channels. If the answer is no, the flow returns to S72 in which a second channel is selected, and in S73, the picture of the program currently aired on the second channel is captured.

Similar processing is repeated until it is judged in S74 that all the broadcast channels have been searched. Then, it is further determined in S75 whether the variable i is the maximum value, i.e., whether the search has been completed for all the currently-aired programs and the future programs to be transmitted as EPG. If the answer is no, the flow proceeds to S76 in which the variable i is incremented by one, and the flow further returns to S72 in which similar processing is repeated.

Figure 40:
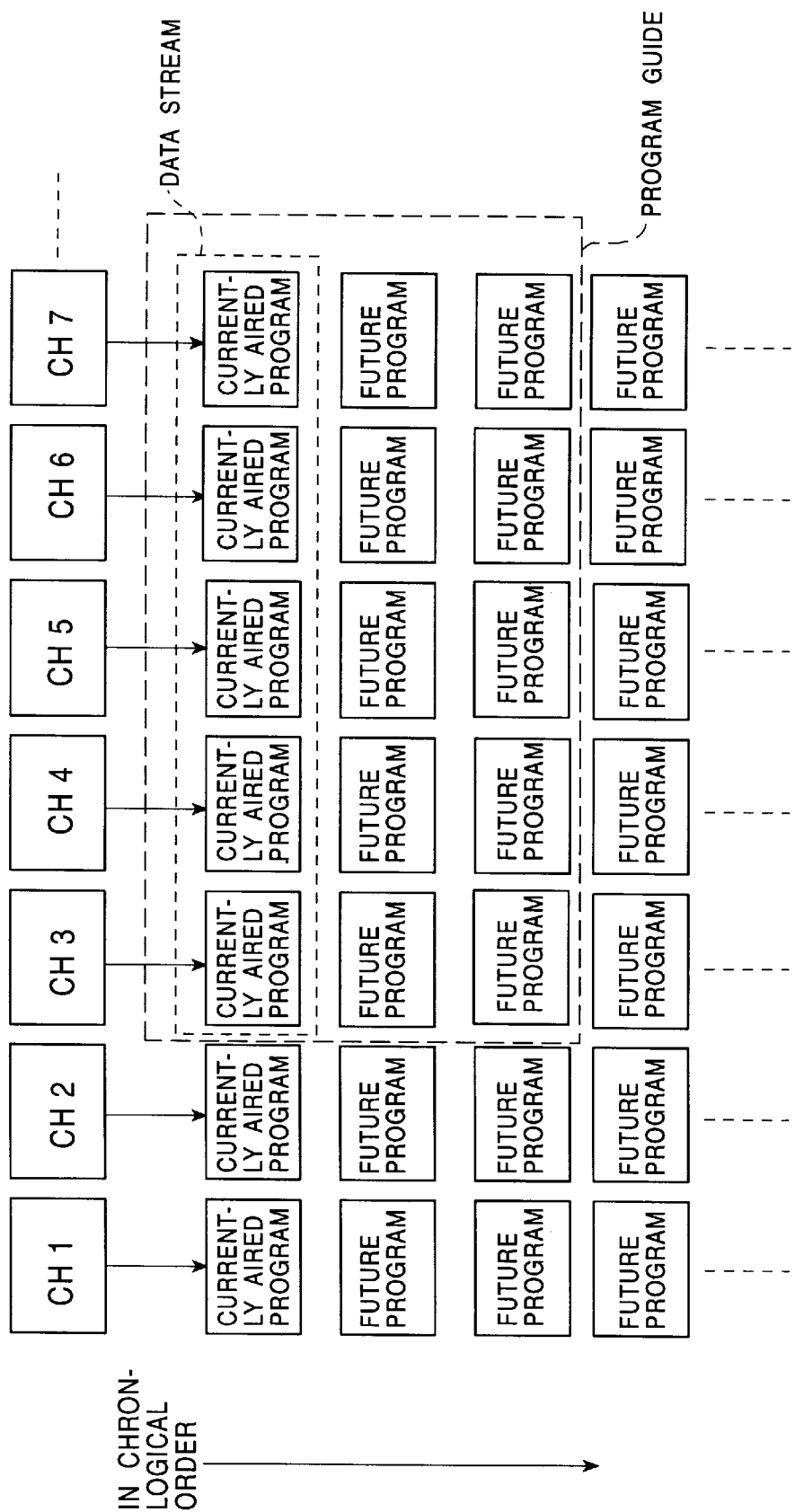
FIG. 40 illustrates a program guide obtained by the processing shown in FIG. 39.

In this manner, future programs to be broadcast subsequent to the currently-aired programs are sequentially captured channel by channel. Similar processing is further repeated until it is determined in S75 that the search has been completed on all the programs to be transmitted as EPG. As a consequence, still pictures which are categorized by channel, as shown in FIG. 40, are stored into the EPG area 35A in chronological order. Then, the pictures within a predetermined zone of the area 35A are read and displayed as a data stream or a program guide.

In the above-described embodiments, the individual program categories or the individual channels are displayed in the horizontal direction, they may be also displayed in the vertical direction. An example of a data stream of such a modification is shown in FIG. 41, and the corresponding guide is illustrated in FIG. 42.

When only a data stream is displayed, it may be placed in the lower portion of the screen, as shown in FIG. 4, or in the upper portion of the screen, as illustrated in FIG. 33. If, however, a program guide, as well as a data stream, is displayed, the data stream is preferably disposed in the upper portion of the screen, as shown in FIG. 33, for a clarified relationship between the data stream and the guide. Thus, a program guide can be displayed in such a manner that the other still pictures are added under the data stream, as illustrated in FIG. 32. In contrast, if the data stream is displayed in the lower portion of the screen, as shown in FIG. 4, the other pictures are inevitably displayed above the data stream, which is visually unnatural and uncomfortable.

Figure 41:
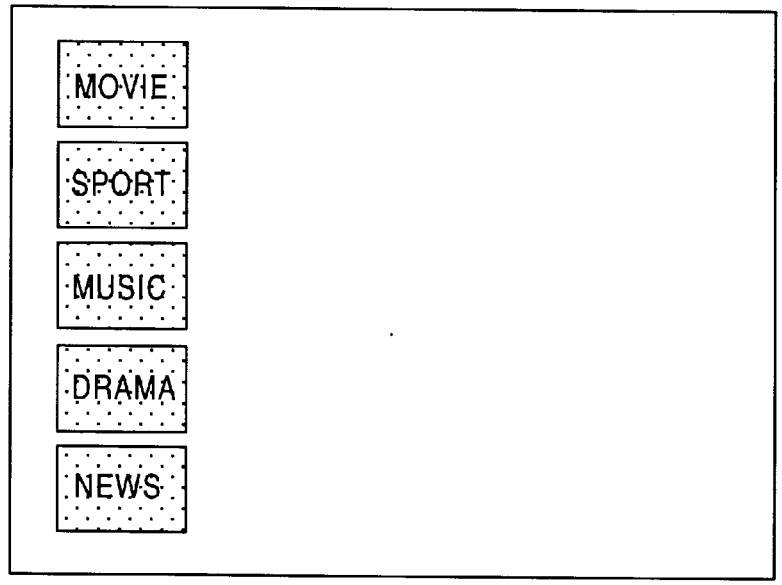
FIG. 41 illustrates another display example of a data stream.
Figure 42:
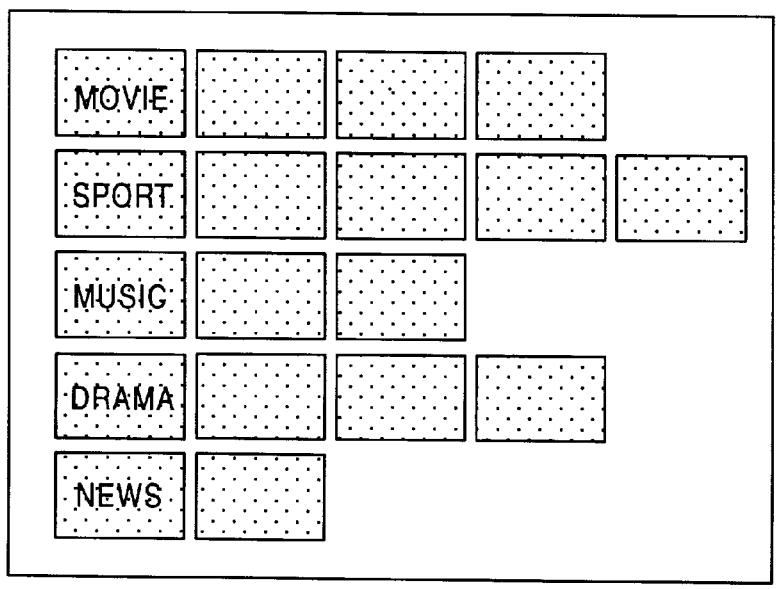
FIG. 42 illustrates another display example of a program guide.

Similarly, the program categories disposed in the vertical direction are preferably arranged at the left portion of the screen, as shown in FIG. 41. This makes it possible to display a program guide in which the other pictures are added to the data stream in the right direction, as illustrated in FIG. 42. In contrast, if the data stream is placed at the right portion of the screen, the pictures are inevitably added in the left direction, which is visually unnatural and uncomfortable.

Figure 43:
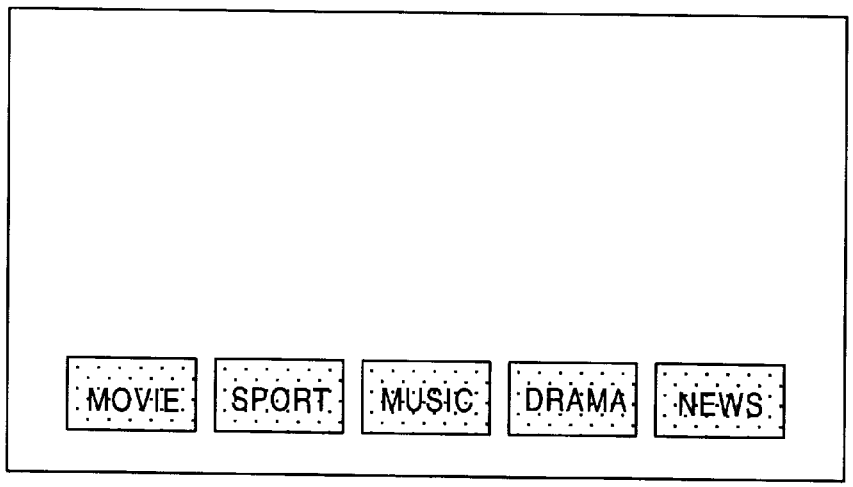
FIG. 43 illustrates a display example of a data stream in a laterally-wider screen.
Figure 44:
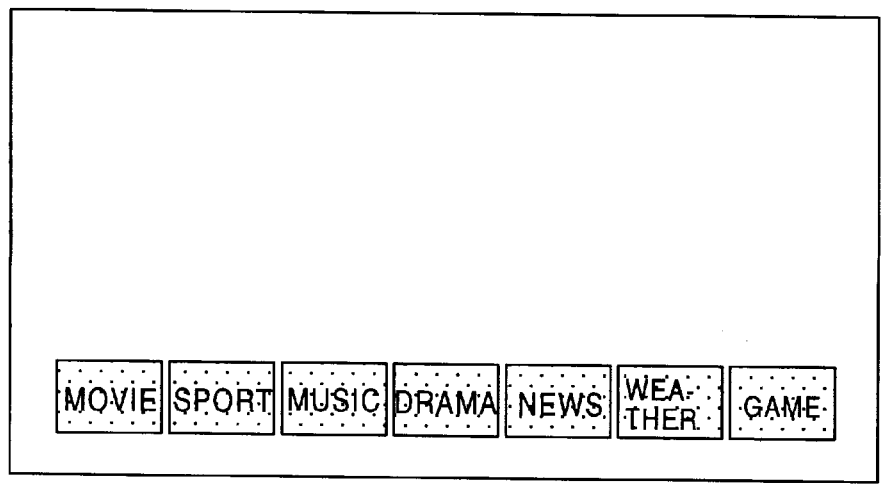
FIG. 44 illustrates another display example of a data stream in a laterally-wider screen.

When the monitor 4 has an aspect ratio of 4:3, it is natural to set the aspect ratio of the still pictures to be 4:3, as has been discussed above. On the other hand, if the monitor 4 has an aspect ratio of, for example, 16:9 (laterally wider screen), the aspect ratio of the still picture is accordingly set to be 16:9. Alternatively, even when the monitor 4 has an aspect ratio of 16:9, the aspect ratio of the pictures may be set to be 4:3, as illustrated in FIG. 44, which enables a greater number of pictures to be displayed on the screen than that shown in FIG. 43. Further, alternatively, the number of the pictures may be variable not only by the size of the screen but also by resolution. For example, since smaller-sized images can be represented with higher resolution, a greater number of pictures may be displayed.

Also, the above-described category icons and station logos may be substituted with names or numbers. Additionally, a longer synopsis on the information screen may be scrolled.

Although various instructions are input by manipulating the remote commander 5, the button switches disposed on the front surface of the IRD 2 may be directly actuated. It is also possible to use a pointing device, such as a joystick or the like, as the operation unit disposed on the front surface of the IRD 2 or the remote commander 5.

As described above, the present invention has been explained by its application to the IRD 2 by way of example. It may, however, be possible to build the IRD 2 into the monitor (television receiver) 4. The present invention is also applicable to a set top box for a cable television system, a VCR, a personal computer, etc.

As will be clearly understood from the foregoing description, the present invention offers the following advantages.

According to a control apparatus for displaying an electronic program guide and its control method, a plurality of still pictures are displayed category by category in a band-like form, and a predetermined picture is selected by designating it with a cursor. It is thus possible to speedily and positively select a desired program from a plurality of programs.

What is claimed is:

1. A control apparatus for displaying an electronic program guide that is used for selecting a program and includes a reduced-sized still picture of a typical frame of said program, said control apparatus comprising:
   still-picture display means for categorizing a plurality of still pictures into a first plurality of categories and for displaying one still picture from each of a second plurality of said categories in one of a single row and a single column;
   designating means for designating with a cursor a predetermined still picture selected from said plurality of still pictures; and
   selection means for selecting said still picture designated by said designating means.

2. A control apparatus for displaying an electronic program guide that is used for selecting a program and includes a reduced-sized still picture of a typical frame of said program, said control apparatus comprising:

still-picture display means for categorizing a plurality of said still pictures and displaying them in one of a single row or a single column;

designating means for designating with a cursor a predetermined still picture selected from said plurality of still pictures; and selection means for selecting said still picture designated by said designating means, wherein said still-picture display means scrolls said categorized still pictures designated by said cursor when an instruction is given to shift said cursor in the direction perpendicular to the row or column arrangement of said pictures.

3. A control apparatus for displaying an electronic program guide that is used for selecting a program and includes a reduced-sized still picture of a typical frame of said program, said control apparatus comprising:

still-picture display means for categorizing a plurality of said still pictures and displaying them in one of a single row or a single column;

designating means for designating with a cursor a predetermined still picture selected from said plurality of still pictures; and selection means for selecting said still picture designated by said designating means, wherein said still-picture display means scrolls said still pictures to display a still picture other than said categorized still pictures when an instruction is given to further outwardly shift said cursor which is positioned at an edge of the row or column arrangement of said pictures.

4. A control method for displaying an electronic program guide that is used for selecting a program and includes a reduced-sized still picture of a typical frame of said program, said method comprising the steps of:

categorizing a plurality of still pictures into a first plurality of categories;

displaying one still picture from each of a second plurality of said categories in one of a single row and a single column;

designating with a cursor a predetermined still picture selected from said plurality of still pictures; and selecting the designated still picture.

5. A control apparatus for displaying an electronic program guide according to claim 1, wherein each of said still pictures displayed in said row or column includes a category icon representing a category of a program.

6. A control apparatus for displaying an electronic program guide that is used for selecting a program and includes a reduced-sized still picture of a typical frame of said program, said control apparatus comprising:

still-picture display means for categorizing a plurality of said still pictures and displaying them in one of a single row or a single column;

designating means for designating with a cursor a predetermined still picture selected from said plurality of still pictures; and selection means for selecting said still picture designated by said designating means, wherein said still-picture display means displays a title bar with said still pictures.

7. A control apparatus for displaying an electronic program guide that is used for selecting a program and includes a reduced-sized still picture of a typical frame of said program, said control apparatus comprising:

still-picture display means for categorizing a plurality of said still pictures and displaying them in one of a single row or a single column;

designating means for designating with a cursor a predetermined still picture selected from said plurality of still pictures; and selection means for selecting said still picture designated by said designating means, wherein each of said still pictures displayed in said row or column includes a category icon representing a category of a program, wherein said category icon is deleted when said cursor is moved on one of said still pictures.

8. A control apparatus for displaying an electronic program guide that is used for selecting a program and includes a reduced-sized still picture of a typical frame of said program, said control apparatus comprising:

still-picture display means for categorizing a plurality of said still pictures and displaying them in one of a single row or a single column;

designating means for designating with a cursor a predetermined still picture selected from said plurality of still pictures; and selection means for selecting said still picture designated by said designating means, wherein said still-picture display means displays a title bar with said still pictures, and wherein said title bar includes a category icon, a station logo and a title of a program.

9. A control apparatus for displaying an electronic program guide that is used for selecting a program and includes a reduced-sized still picture of a typical frame of said program, said control apparatus comprising:

still-picture display means for classifying by channel a plurality of still pictures representative of currently available and future programs and for displaying one classified still picture for each of a plurality of channels in one of a single row or a single column;

designating means for designating with a cursor a predetermined still picture selected from said plurality of still pictures; and selection means for selecting said still picture designated by said designating means.

10. A control method for displaying an electronic program guide that is used for selecting a program and includes a reduced-sized still picture of a typical frame of said program, said method comprising the steps of:

classifying by channel a plurality of still pictures representative of currently available and future programs;

displaying one classified still picture for each of a plurality of channels in one of a single row and a single column;

designating with a cursor a predetermined still picture selected from said plurality of still pictures; and selecting the designated still picture.

* * * * *